US012749016B2

(12) United States Patent
Tiwari et al.

(10) Patent No.: US 12,749,016 B2
(45) Date of Patent: Sep. 29, 2026

(54) MACHINE LEARNING EVALUATION FOR DETECTING FEATURE BIAS

(71) Applicant: Optum, Inc., Minnetonka, MN (US)

(72) Inventors: Arun Tiwari, Delhi (IN); Amardeep Sharma, Uttar Pradesh (IN); Rahul Pathak, Uttar Pradesh (IN); Sudhanshu Sharma, Bangalore (IN); Urvi Sharma, Uttar Pradesh (IN); Radhika Agarwal, West Bengal (IN)

(73) Assignee: Optum, Inc., Minnetonka, MN (US)

( * ) Notice: Subject to any disclaimer, the term of this patent is extended or adjusted under 35 U.S.C. 154(b) by 809 days.

(21) Appl. No.: 18/077,781

(22) Filed: Dec. 8, 2022

(65) Prior Publication Data

US 2024/0193470 A1 Jun. 13, 2024

(51) Int. Cl.
*G06N 20/00* (2019.01)

(52) U.S. Cl.
CPC .................................... *G06N 20/00* (2019.01)

(58) Field of Classification Search
CPC ...... G06N 20/00; G06V 10/82; G06V 10/776; G06V 17/16; G06F 17/16; G06F 18/23
USPC ............................................................ 706/12
See application file for complete search history.

(56) References Cited

U.S. PATENT DOCUMENTS 10,579,932 B1 * 3/2020 Cantrell ............ G06F 16/24568
2020/0160180 A1 5/2020 Lehr et al.
2020/0372472 A1 11/2020 Kenthapadi et al.
2021/0081841 A1 * 3/2021 Sikka .................. G06N 3/0464
2021/0319333 A1 10/2021 Lee et al.
2021/0374582 A1 12/2021 Tristan et al.
2021/0383268 A1 * 12/2021 Miroshnikov ......... G06N 20/00
2021/0406712 A1 12/2021 Bhide et al.
2022/0012542 A1 1/2022 Cruz et al.
2022/0012613 A1 1/2022 Datta et al.
(Continued)

FOREIGN PATENT DOCUMENTS

WO 2022/183019 A1 9/2022
WO 2022/240860 A1 11/2022

OTHER PUBLICATIONS

Evaluating Performance of Regression Machine Learning Models Using Multiple By Alexei Botchkarev (Year: 2018).*
(Continued)

*Primary Examiner* — Neveen Abel Jalil
(74) *Attorney, Agent, or Firm* — Alston & Bird LLP

(57) ABSTRACT

Various embodiments of the present disclosure disclose machine-learning based evaluation techniques for detecting feature bias. An evaluation framework is provided that utilizes new evaluation data structures for comprehensibly evaluating feature bias in machine learning models. The evaluation framework includes receiving evaluation dataset for a machine learning model that includes one or more different feature classes of an evaluation feature. The evaluation framework includes generating, using an evaluation function, at least two performance metrics for the machine learning model and generating a unitless dissimilarity metric for the evaluation feature based at least in part on the first performance metric, the second performance metric, and an average between the first and second performance metrics. In this way, the unitless dissimilarity metric is based on a variability associated with the evaluation feature.

18 Claims, 11 Drawing Sheets

(56) References Cited

U.S. PATENT DOCUMENTS

| | | | | |
|---|---|---|---|---|
| 2022/0108222 | A1 | 4/2022 | Brannon et al. | |
| 2022/0114399 | A1 | 4/2022 | Castiglione et al. | |
| 2022/0156646 | A1 | 5/2022 | Farrar et al. | |
| 2022/0171991 | A1 | 6/2022 | Das et al. | |
| 2022/0172004 | A1 | 6/2022 | Das et al. | |
| 2022/0277232 | A1 | 9/2022 | Jones | |
| 2022/0414541 | A1* | 12/2022 | Kaczynski | G06N 20/00 |
| 2023/0079815 | A1* | 3/2023 | Chamarthy | G06F 18/10 706/12 |
| 2023/0101200 | A1* | 3/2023 | Sun | G06F 16/367 700/91 |
| 2023/0161933 | A1* | 5/2023 | Stenson | G01S 17/88 703/6 |
| 2023/0228644 | A1* | 7/2023 | Hoorfar | G01M 3/18 73/40.5 R |
| 2024/0046625 | A1 | 2/2024 | Jaipuria et al. | |
| 2024/0193481 | A1 | 6/2024 | Bucklin et al. | |

OTHER PUBLICATIONS

Comparative Assessment of Regression Models Based on Model Evaluation Metrics by Abhishek V Tatachar (Year: 2021).*

"Artificial Intelligence in Healthcare—AI: Its Challenges, Benefits and Future," Optum, (Year: 2020), (4 pages), [Retrieved from the Internet Apr. 12, 2023] <URL: HTTPS://web.archive.org/web/20201027144811/https://www.optum.com/business/resources/library/artificial-intelligence-perspectives.html>.

"FairML: Auditing Black-Box Predictive Models," GitHub, Mar. 23, 2017, (5 pages), [Retrieved from the Internet] <URL: https://github.com/adebayoj/fairml>.

"Fairness in Machine Learning," Fairlearn, (Year: 2018), (4 pages), available online: https://fairlearn.org/v0.7.0/user_guide/fairness_in_machine_learning.html.

"Medical Expenditure Panel Survey," Agency for Healthcare Research and Quality, Jan. 19, 2011, (4 pages), available online: https://meps.ahrq.gov/mepsweb/.

Ararwal, Alekh et al. "Fair Regression: Quantitative Definitions and Reduction-Based Algorithms," In Proceedings of the 36th International Conference on Machine Learning, May 24, 2019 (pp. 120-129), PMLR 97, available online: http:/proceedings.mlr.press/v97/agarwal19d/agarwal19d.pdf.

Bellamy, Rachel K.E. et al. "AI Fairness 360: An Extensible Toolkit For Detecting, Understanding, and Mitigating Unwanted Algorithmic Bias," arXiv: 1810.01943v1 [cs.AI], Oct. 3, 2019 (20 pages), available online: https://arxiv.org/pdf/1810.01943.pdf.

Berk, Richard et al. "A Convex Framework for Fair Regression," arXiv: 1706.02409v1 [cs.LG], Jun. 7, 2017, pp. 1-15, available online: https://arxiv.org/pdf/1706.02409.pdf.

Gursoy, Furkan et al. "Error Parity Fairness—Testing for Group Fairness in Regression Tasks," arXiv: 2208.08279v1 [cs.LG], Aug. 16, 2022, (12 pages), available online: https://arxiv.org/pdf/2208.08279.pdf.

Harvard School of Public Health, "Study: Widely Used Health Care Algorithm Has Racial Bias," (2 pages), (article), (Year: 2023), [Retrieved from the Internet Feb. 15, 2023] <URL: https://www.hsph.harvard.edu/news/hsph-in-the-news/study-widely-used-health-care-algorithm-has-racial-bias/>.

Hickok, Merve et al. "Case Study: The Distilling of a Biased Algorithmic Decision System Through a Business Lens," (Year 2022), (35 pages), available online: https://osf.io/download/61f2ddcc79e27201c620e772/?version=3&displayName=Optum_Final-2022-01-27T21%3A02.683Z.pdf.

Kumar, Ajitesh. "Bias Detection in Machine Learning Models Using FairML," Data Analytics, Oct. 12, 2018, (7 pages), (article, online), [Retrieved from the Internet Apr. 12, 2023] <URL: https://vitalflux.com/bias-detection-machine-learning-fairml/>.

Mishraky, Elhanan et al. "Bias Detection by Using Name Disparity Tables Across Protected Groups," Journal of Responsible Technology, vol. 9:100020, Apr. 2022, (ePub: Dec. 11, 2021), (8 pages), DOI: 10.1016/j.jrt.2021.100020.

Norori, Natalia et al. "Addressing Bias in Big Data and AI for Health Care: A Call for Open Science," Patterns, vol. 2, Issue 10, Oct. 8, 2021, pp. 1-9, available online: https://www.sciencedirect.com/science/article/pii/S2666389921002026.

Paul, Kari. "Healthcare Algorithm Used Across America Has Dramatic Racial Biases," The Guardian, Oct. 25, 2019, pp. 1-5, [Retrieved from the Internet Apr. 12, 2023] <URL: https://www.theguardian.com/society/2019/oct/25/healthcare-algorithm-racial-biases-optum>.

Saleiro, Pedro et al. "Aequitas—A Bias and Fairness Audit Toolkit," arXiv: 1811.05577v2 [cs.LG], Nov. 14, 2018, (10 pages), available online: https://www.researchgate.net/publication/328953080_Aequitas_A_Bias_and_Fairness_Audit_Toolkit.

Schwartz, Reva et al. "Towards a Standard for Identifying and Managing Bias in Artificial Intelligence," National Institute of Standards of Technology Special Publication 1270, Mar. 2022, (86 pages), available online: https://www.dwt.com/-/media/files/blogs/artificial-intelligence-law-advisor/2022/03/nist-sp-1270-identifying-and-managing-bias-in-ai.pdf.

Steinberg, Daniel et al. "Fairness Measures for Regression Via Probabilistic Classification," arXiv: 2001.06089v2 [cs.LG], Mar. 5, 2020, (9 pages), available online: https://arxiv.org/pdf/2001.06089.pdf.

Wilson, Christo et al. "Auditing the Pymetrics Model Generation Process," pp. 1-23, Available online at https://cbw.sh/static/audit/pymetrics/pymetrics_audit_result_whitepaper.pdf.

Zafar, Bilal et al. "Learn How Amazon SageMaker Clarify Helps Detect Bias," AWS Machine Learning Blog, Sep. 1, 2022, pp. 1-12, [Retrieved from the Internet Sep. 22, 2022] <URL: https://aws.amazon.com/blogs/machine-learning/learn-how-amazon-sagemaker-clarify-helps-detect-bias/>.

Extended European Search Report for European Patent Application No. 23208810.4, dated May 6, 2024, 10 pages.

Karkkainen, et al., "FairFace: Face Attribute Dataset for Balanced Race, Gender, and Age for Bias Measurement and Mitigation", IEEE, pp. 1547-1557, Jan. 3, 2021, DOI: 10.1109/WACV48630.2021.00159.

Pfohl, et al., "An Empirical Characterization of Fair Machine Learning for Clinical Risk Prediction", Journal of Biomedical Informatics, vol. 113, (67 pages), Nov. 18, 2020, DOI: 10.1016/J.JBI.2020.103621.

Shi, et al., "Algorithm Bias Detection and Mitigation in Lenovo Face Recognition Engine", Natural Language Processing and Chinese Computing, Lecture Notes in Computer Science, vol. 12431, (12 pages), Oct. 2, 2020, DOI:10.1007/978-3-030-60457-8_36.

"Censored regression model", Wikipedia Foundation, last edited Mar. 9, 2021, available on the Internet at https://en.wikipedia.org/w/index.php?title=Censored_regression_model&oldid=1011196608, 2 pages.

"Coefficient of variation", Wikipedia Foundation, last edited Feb. 1, 2011, retrieved from the Internet at https://web.archive.org/web/20110205232144/http://en.wikipedia.org/wiki/Coefficient_of_variation; 3 pages.

Alelyani, Salem, "Detection and Evaluation of Machine Learning Bias", Applied Sciences, Jul. 2021, 17 pages, vol. 11, No. 6271, MDPI, Switzerland.

Muniraj, Padhma, "Loss functions to evaluate Regression Models", Medium, Analytics Vidhya, Dec. 17, 2021, 30 pages.

Kärkkäinen, Kimmo, et al., "FairFace: Face Attribute Dataset for Balanced Race, Gender, and Age", Cornell University Olin Library Archive, submitted Aug. 14, 2019, available on the Internet at arXiv:1908.04913v1, 11 pages.

Non-Final Rejection Mailed on Nov. 5, 2025 for U.S. Appl. No. 18/077,840, 75 page(s).

Patty, John W., et al., "Algorithmic Fairness and Statistical Discrimination", Cornell University Olin Library Archive, submitted Aug. 17, 2022, available on the Internet at arXiv:2208.08341v1, 34 pages.

Wang, Hai, et al., "Content-based Image Retrieval Using Fractional Distance Metric", Proceedings of 2012 International Conference on Image Analysis and Signal Processing, Nov. 9-12, 2012, 5 pages, Hangzhou, China.

(56) References Cited

OTHER PUBLICATIONS

Notice of Allowance and Fees Due (PTOL-85) Mailed on Apr. 28, 2026 for U.S. Appl. No. 18/077,840, 32 page(s).

* cited by examiner

| 806 | 808 | 810 | 812 | 814 | 802 |
|---|---|---|---|---|---|
| 806A | 0.6 | 0.67 | 0.005 | 0.25 | 36.86 |
| 806B | 0.7 | | 0.001 | | |
| 806C | 0.8 | | 0.017 | | |
| 806D | 0.7 | | 0.001 | | |
| 806E | 0.7 | | 0.001 | | |
| 806F | 0.7 | | 0.001 | | |
| 806G | 0.7 | | 0.001 | | |
| 806H | 0.7 | | 0.001 | | |
| 806I | 0.6 | | 0.005 | | |
| 806J | 0.5 | | 0.029 | | |

804

FIG. 8

900

| 906 | 904a | 904b |
|---|---|---|
| 906A | 15.4% (908a) | 10.4% (908c) |
| 906B | 1.3% (908b) | 0.3% |
| 906C | 90.5% | 19.4% |
| 906D | 22.1% | 15.5% |
| 906E | 15.1% | 9.0% |
| 906F | 36.8% | 10.4% |
| 906G | 16.2% | 8.0% |
| 906H | 4.5% | 2.4% |
| 906I | 2.8% | 1.3% |
| 906J | 8.7% | 4.5% |
| 906K | 6.9% | 1.3% |
| 906L | 1.6% | 0.1% |

902

BIAS CONDITIONS

GOOD: COV<=10% — 910

ACCEPTABLE:10%<COV<=30% — 912

UNACCEPTABLE:COV>30% — 914

FIG. 9

| 806 | 808 | 810 | 1102 | 1104 |
|---|---|---|---|---|
| 806A | 0.6 | 0.67 | 0.07 | 10.4 |
| 806B | 0.7 | | 0.03 | 4.5 |
| 806C | 0.8 | | 0.13 | 19.4 |
| 806D | 0.7 | | 0.03 | 4.5 |
| 806E | 0.7 | | 0.03 | 4.5 |
| 806F | 0.7 | | 0.03 | 4.5 |
| 806G | 0.7 | | 0.03 | 4.5 |
| 806H | 0.7 | | 0.03 | 4.5 |
| 806I | 0.6 | | 0.07 | 10.4 |
| 806J | 0.5 | | 0.17 | 25.4 |

804

1106

1108

FIG. 11

MACHINE LEARNING EVALUATION FOR DETECTING FEATURE BIAS

BACKGROUND

Various embodiments of the present disclosure address technical challenges related to machine learning model evaluation techniques given limitations of existing evaluation processes. In doing so, various embodiments of the present disclosure make important contributions to various existing evaluation and machine learning systems.

BRIEF SUMMARY

In general, embodiments of the present disclosure disclose evaluation techniques for detecting and gauging feature bias in machine learning models. The present disclosure is directed to an evaluation framework and evaluation metrics for evaluating machine learning model performance. Using the techniques described herein, transparent, comprehensive, and universally comparable evaluation metrics may be generated for a machine learning model. These evaluation metrics may ultimately be utilized to detect, track, and optimize against bias in machine learning models resulting in increased machine learning model accuracy as well as other improvements.

In accordance with one embodiment, a computer-implemented method for evaluating potential bias in machine learning models is provided. The computer-implemented method comprises receiving, by one or more processors, an evaluation dataset for a machine learning model, wherein the evaluation dataset comprises a plurality of evaluation data objects associated with one or more different feature classes of an evaluation feature; generating, by the one or more processors and using an evaluation function, at least two performance metrics for the machine learning model based at least in part on the plurality of evaluation data objects, wherein the at least two performance metrics comprise: a first performance metric based at least in part on a first plurality of the plurality of evaluation data objects that are associated with a first feature class of the evaluation feature, and a second performance metric based at least in part on a second plurality of the plurality of evaluation data objects that are associated with a second feature class of the evaluation feature; generating, by the one or more processors, a unitless dissimilarity metric for the evaluation feature based at least in part on the first performance metric, the second performance metric, and an average performance measure of the at least two performance metrics; and providing, by the one or more processors, a machine learning verification output for the machine learning model based at least in part on the unitless dissimilarity metric.

In accordance with another embodiment, a computing apparatus for evaluating potential bias in machine learning models is provided. The computing apparatus comprises a processor; and a memory storing instructions that, when executed by the processor, configure the computing apparatus to: receive an evaluation dataset for a machine learning model, wherein the evaluation dataset comprises a plurality of evaluation data objects associated with one or more different feature classes of an evaluation feature; generate, using an evaluation function, at least two performance metrics for the machine learning model based at least in part on the plurality of evaluation data objects, wherein the at least two performance metrics comprise: a first performance metric based at least in part on a first plurality of the plurality of evaluation data objects that are associated with a first feature class of the evaluation feature, and a second performance metric based at least in part on a second plurality of the plurality of evaluation data objects that are associated with a second feature class of the evaluation feature; generate a unitless dissimilarity metric for the evaluation feature based at least in part on the first performance metric, the second performance metric, and an average performance measure of the at least two performance metrics; and provide a machine learning verification output for the machine learning model based at least in part on the unitless dissimilarity metric.

In accordance with yet another embodiment, a non-transitory computer-readable storage medium for evaluating potential bias in machine learning models is provided. The non-transitory computer-readable storage medium includes instructions that when executed by a computer, cause the computer to: receive an evaluation dataset for a machine learning model, wherein the evaluation dataset comprises a plurality of evaluation data objects associated with one or more different feature classes of an evaluation feature; generate, using an evaluation function, at least two performance metrics for the machine learning model based at least in part on the plurality of evaluation data objects, wherein the at least two performance metrics comprise: a first performance metric based at least in part on a first plurality of the plurality of evaluation data objects that are associated with a first feature class of the evaluation feature, and a second performance metric based at least in part on a second plurality of the plurality of evaluation data objects that are associated with a second feature class of the evaluation feature; generate a unitless dissimilarity metric for the evaluation feature based at least in part on the first performance metric, the second performance metric, and an average performance measure of the at least two performance metrics; and provide a machine learning verification output for the machine learning model based at least in part on the unitless dissimilarity metric.

In accordance with an embodiment, a computer-implemented method for evaluating potential bias in machine learning models is provided. The computer-implemented method comprises: receiving, by one or more processors, an evaluation dataset for a machine learning model, wherein the evaluation dataset comprises a plurality of evaluation data objects associated with one or more different feature classes of an evaluation feature; identifying, by the one or more processors, at least one evaluation function for evaluating the machine learning model based at least in part on the evaluation dataset and the evaluation feature; generating, by the one or more processors using the at least one evaluation function, at least two performance metrics for the machine learning model based at least in part on the plurality of evaluation data objects, wherein the at least two performance metrics comprise a first performance metric associated with a first feature class of the evaluation feature and a second performance metric associated with a second feature class of the evaluation feature; generating, by the one or more processors, a unitless dissimilarity metric for the evaluation feature based at least in part on the first performance metric and the second performance metric; and providing, by the one or more processors, a machine learning verification output for the machine learning model based at least in part on the unitless dissimilarity metric.

In accordance with another embodiment, a computing apparatus for evaluating potential bias in machine learning models is provided. The computing apparatus comprises a processor; and a memory storing instructions that, when executed by the processor, configure the computing apparatus to: receive an evaluation dataset for a machine learning model, wherein the evaluation dataset comprises a plurality of evaluation data objects associated with one or more different feature classes of an evaluation feature; identify at least one evaluation function for evaluating the machine learning model based at least in part on the evaluation dataset and the evaluation feature; generate, using the at least one evaluation function, at least two performance metrics for the machine learning model based at least in part on the plurality of evaluation data objects, wherein the at least two performance metrics comprise a first performance metric associated with a first feature class of the evaluation feature and a second performance metric associated with a second feature class of the evaluation feature; generate a unitless dissimilarity metric for the evaluation feature based at least in part on the first performance metric and the second performance metric; and provide a machine learning verification output for the machine learning model based at least in part on the unitless dissimilarity metric.

In accordance with yet another embodiment, a non-transitory computer-readable storage medium for evaluating potential bias in machine learning models is provided. The non-transitory computer-readable storage medium includes instructions that when executed by a computer, cause the computer to: receive an evaluation dataset for a machine learning model, wherein the evaluation dataset comprises a plurality of evaluation data objects associated with one or more different feature classes of an evaluation feature; identify at least one evaluation function for evaluating the machine learning model based at least in part on the evaluation dataset and the evaluation feature; generate, using the at least one evaluation function, at least two performance metrics for the machine learning model based at least in part on the plurality of evaluation data objects, wherein the at least two performance metrics comprise a first performance metric associated with a first feature class of the evaluation feature and a second performance metric associated with a second feature class of the evaluation feature; generate a unitless dissimilarity metric for the evaluation feature based at least in part on the first performance metric and the second performance metric; and provide a machine learning verification output for the machine learning model based at least in part on the unitless dissimilarity metric.

BRIEF DESCRIPTION OF THE SEVERAL VIEWS OF THE DRAWINGS

Figure 1:
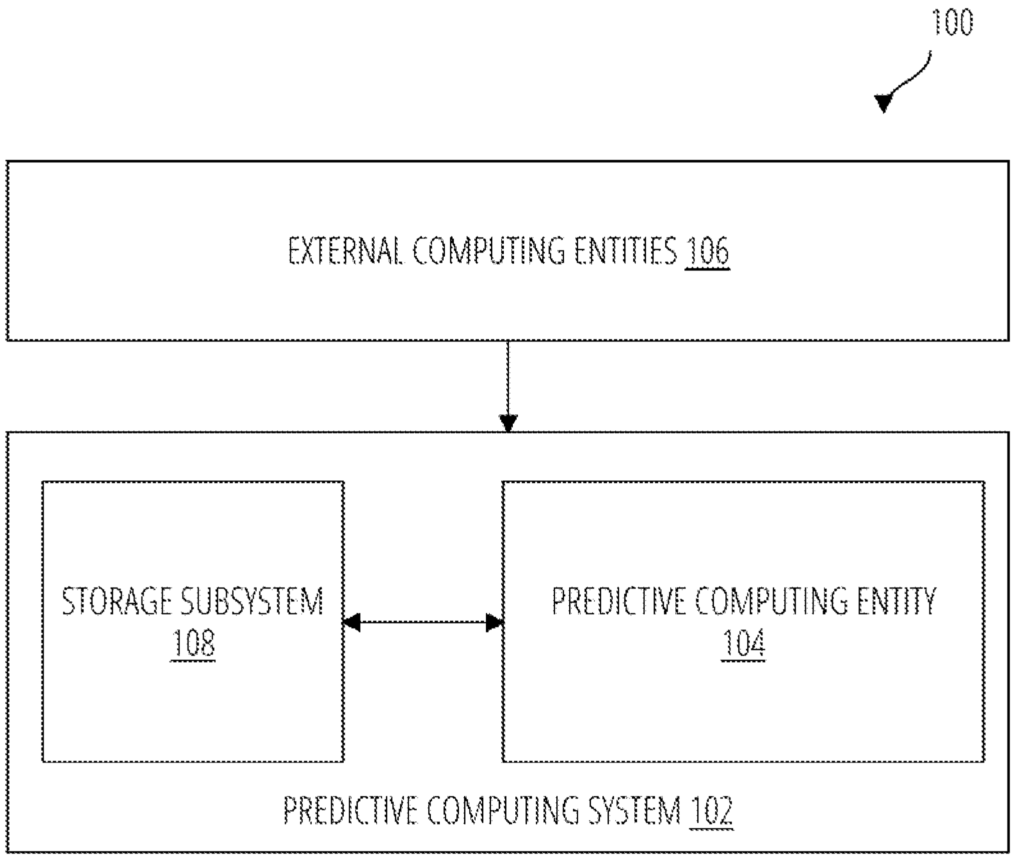

Having thus described the disclosure in general terms, reference will now be made to the accompanying drawings, which are not necessarily drawn to scale, and wherein:

FIG. 1 provides an exemplary overview of a system that may be used to practice embodiments of the present disclosure.

Figure 2:
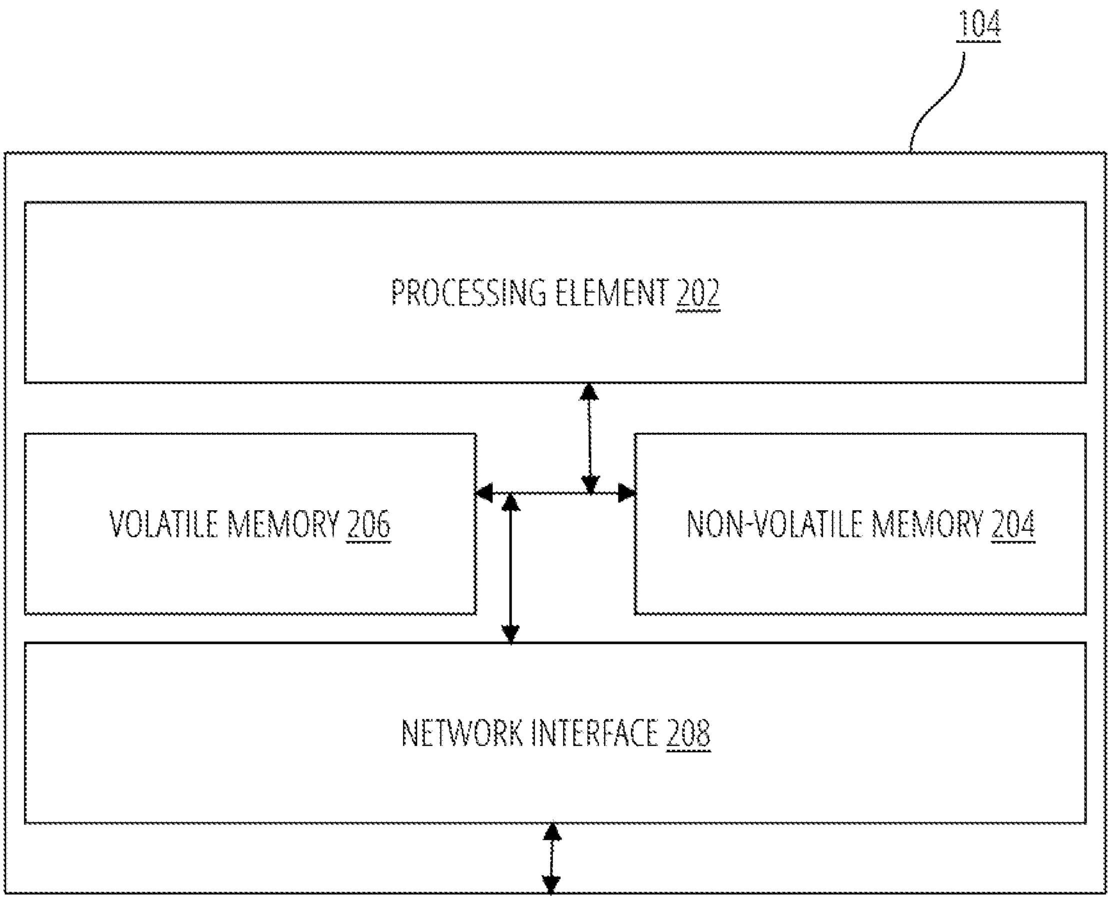

FIG. 2 provides an example predictive computing entity in accordance with some embodiments discussed herein.

Figure 3:
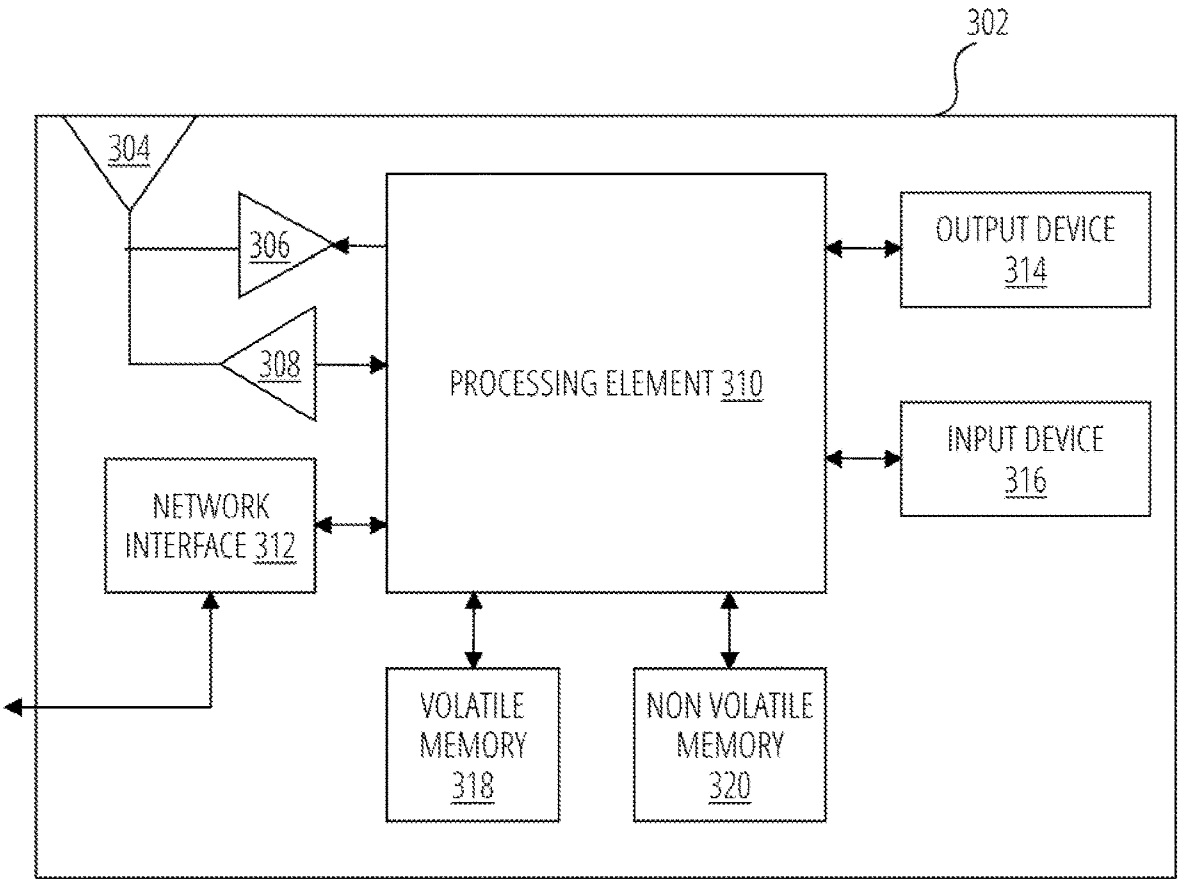

FIG. 3 provides an example computing entity in accordance with some embodiments discussed herein.

Figure 4:
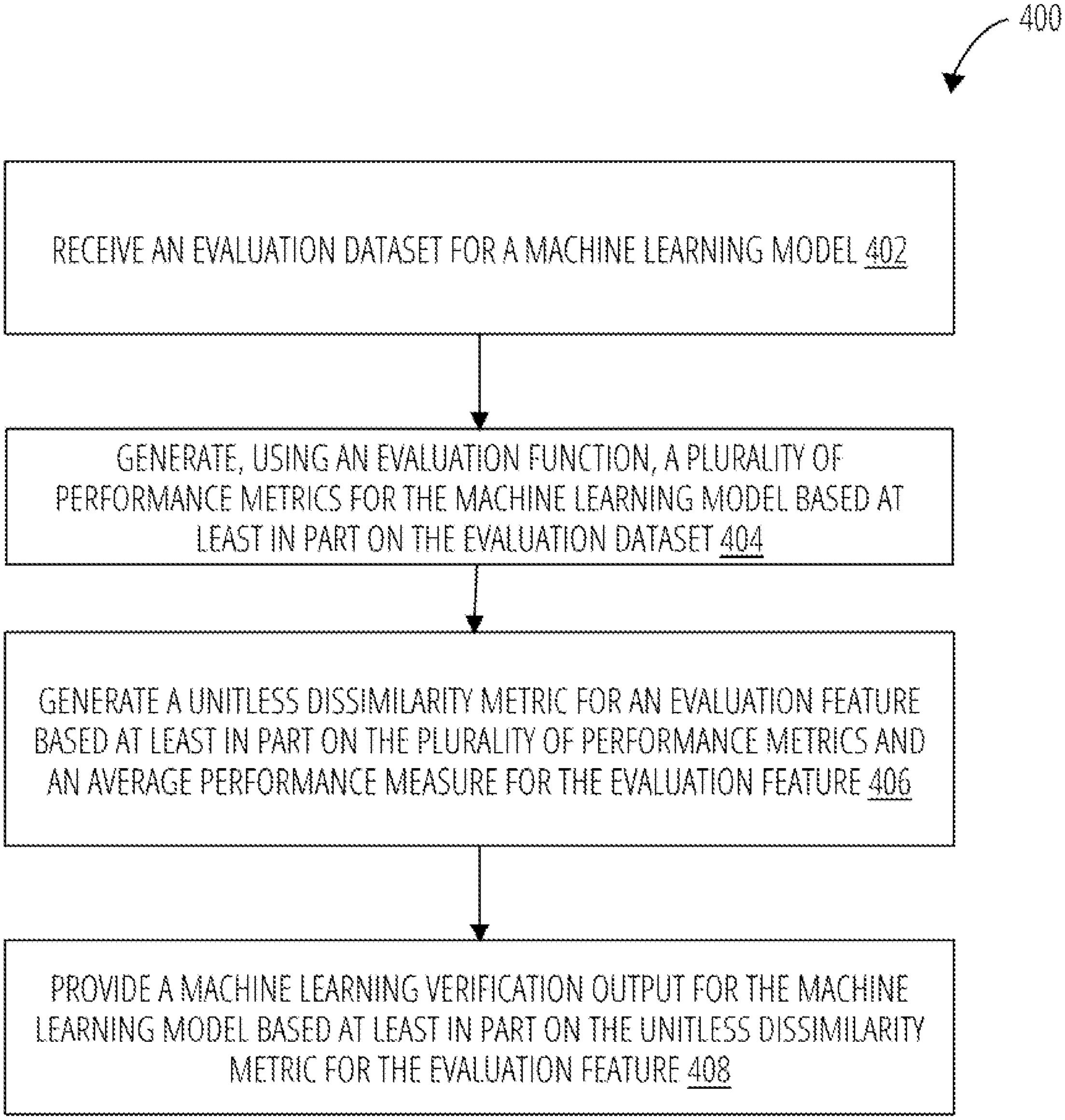

FIG. 4 provides a flowchart diagram of an example process for evaluating potential bias in machine learning models in accordance with some embodiments discussed herein.

Figure 5:
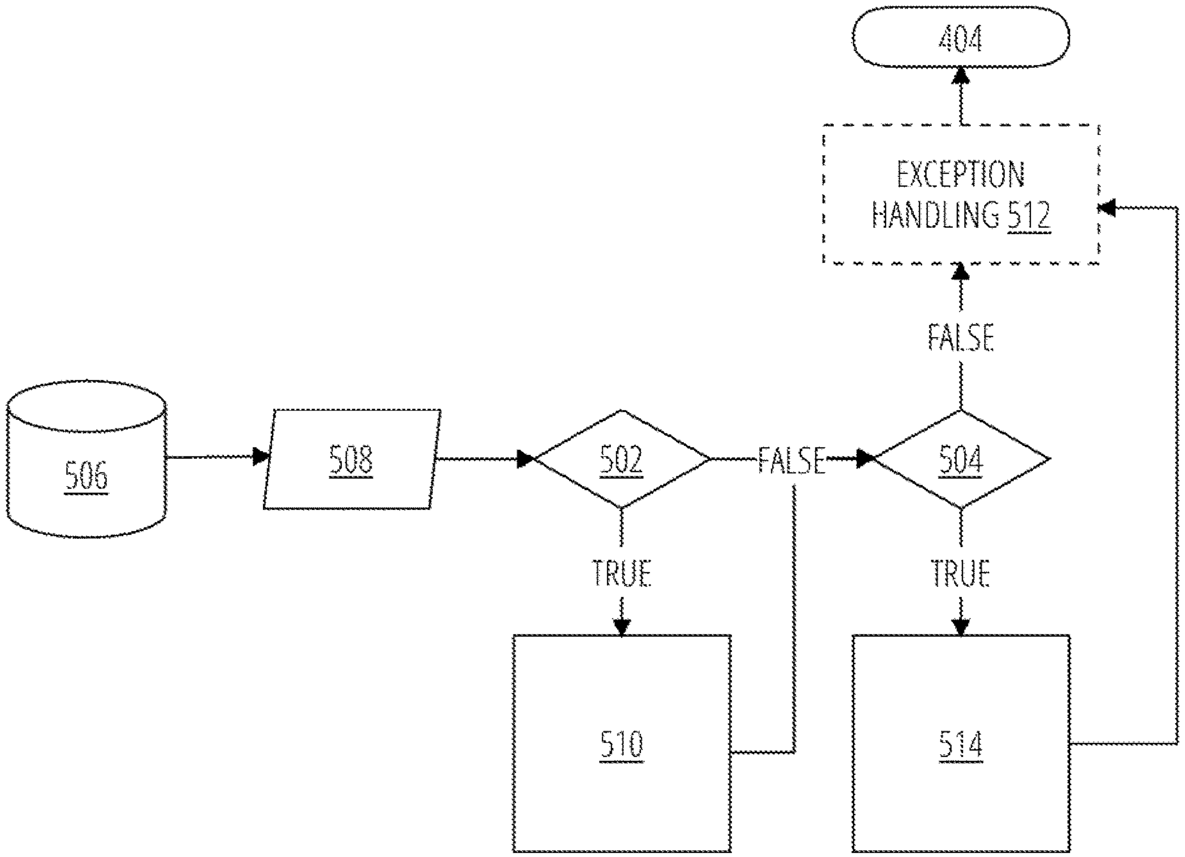

FIG. 5 provides a block diagram for example data processing techniques in accordance with some embodiments discussed herein.

Figure 6:
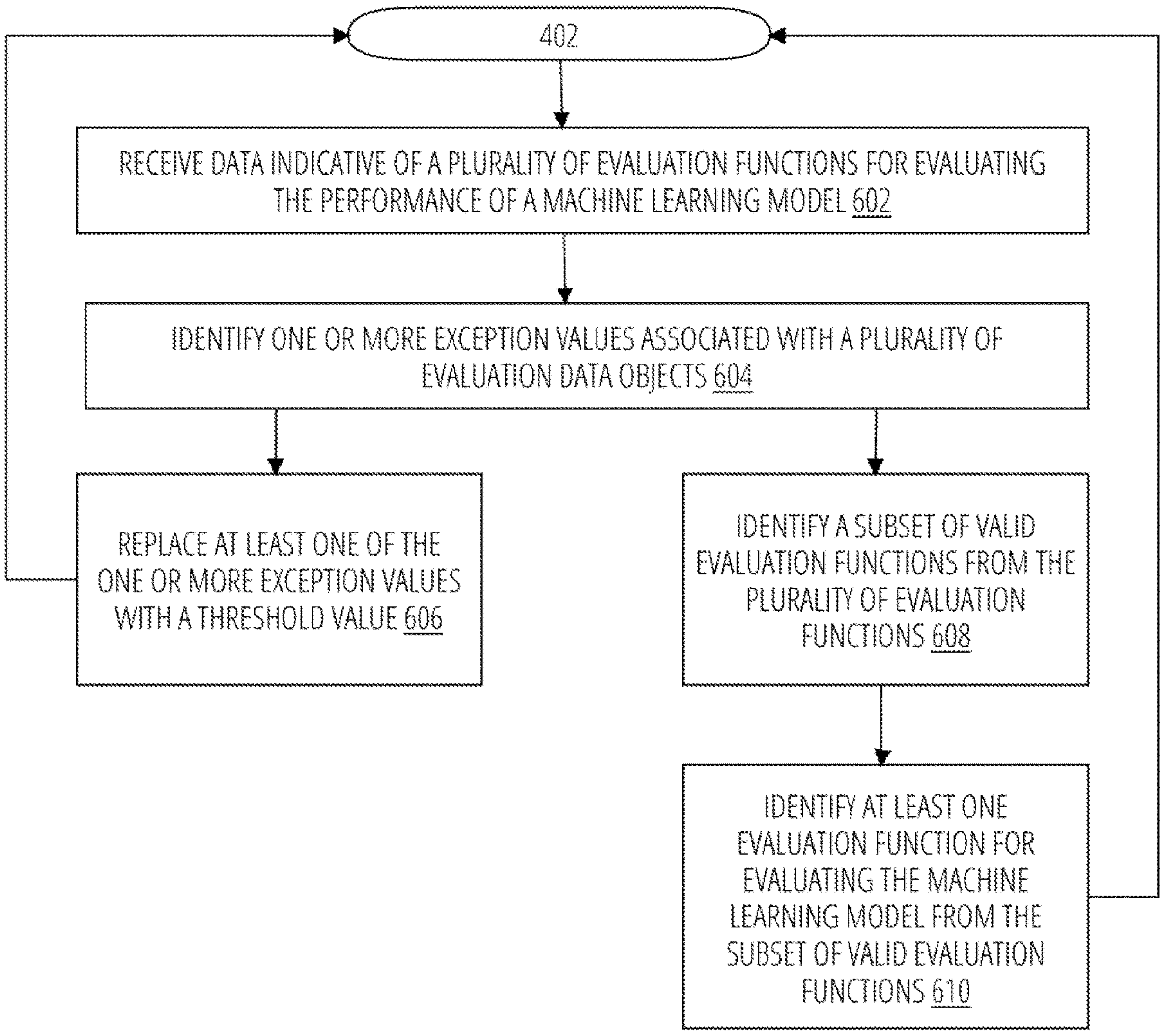

FIG. 6 provides a flowchart diagram of an example process for handling data exceptions in accordance with some embodiments discussed herein.

Figure 7:
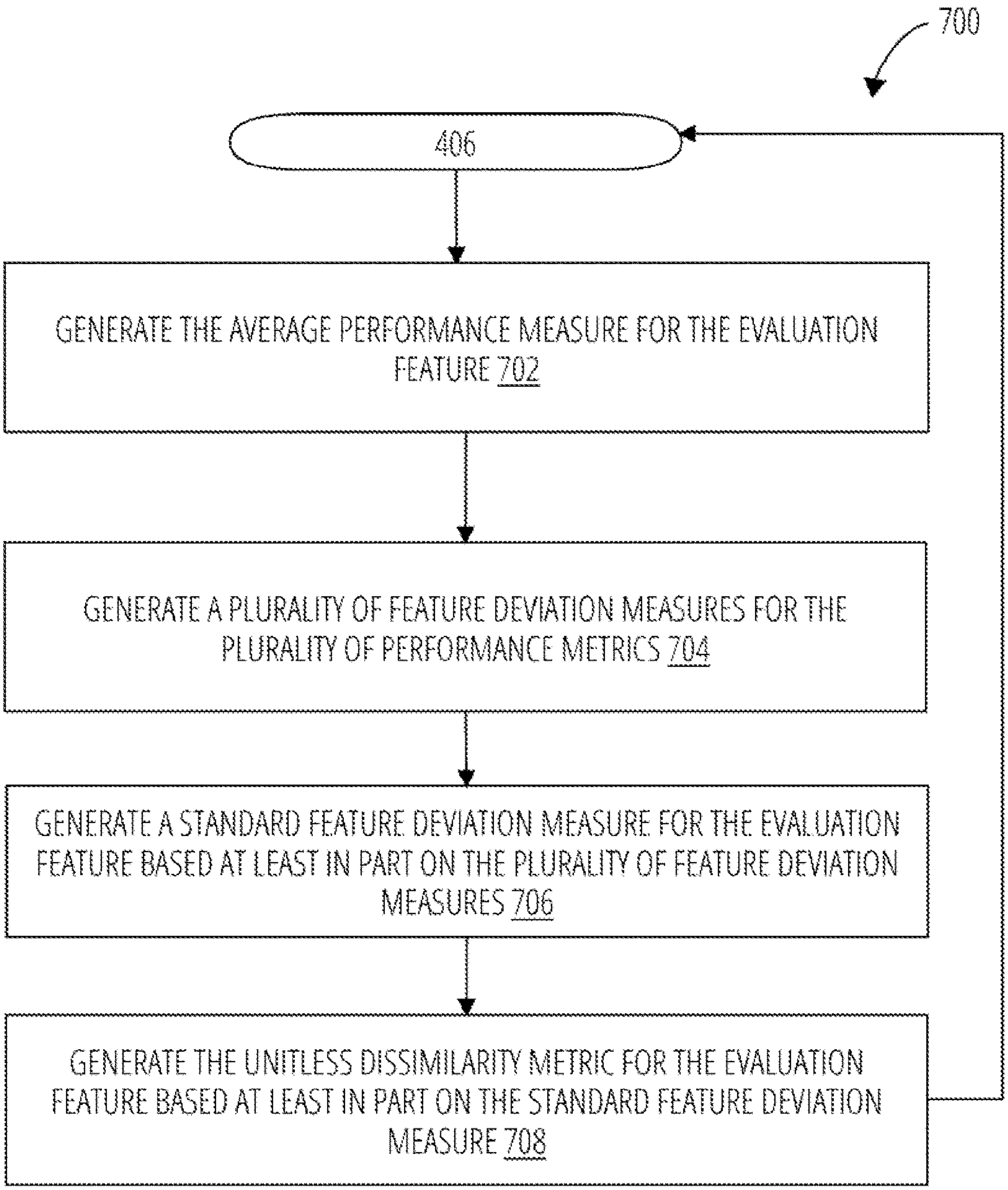

FIG. 7 provides a flowchart diagram of an example process for generating a unitless dissimilarity metric for a machine learning model in accordance with some embodiments discussed herein.

FIG. 8 provides an operational example of a unitless dissimilarity metric for a machine learning model in accordance with some embodiments discussed herein.

FIG. 9 provides an operational example of a machine learning verification output for a machine learning model in accordance with some embodiments discussed herein.

Figure 10:
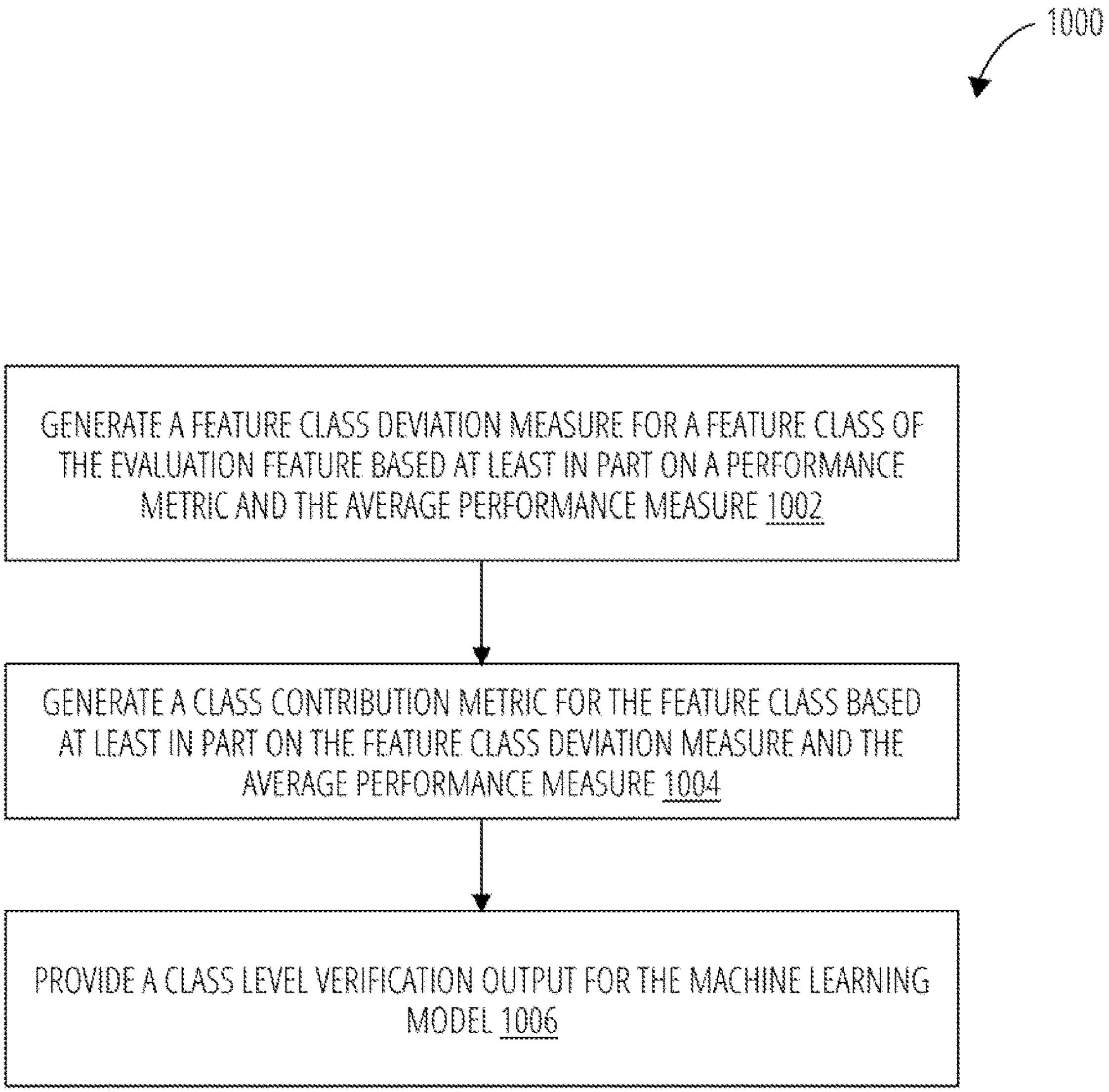

FIG. 10 provides a flowchart diagram of an example process for generating a class level verification output for a machine learning model in accordance with some embodiments discussed herein.

FIG. 11 provides an operational example of a class level verification output for a machine learning model in accordance with some embodiments discussed herein.

DETAILED DESCRIPTION

Various embodiments of the present disclosure are described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. The term “or” is used herein in both the alternative and conjunctive sense, unless otherwise indicated. The terms “illustrative” and “exemplary” are used to be examples with no indication of quality level. Terms such as “computing,” “determining,” “generating,” and/or similar words are used herein interchangeably to refer to the creation, modification, or identification of data. Like numbers refer to like elements throughout. Moreover, while certain embodiments of the present disclosure are described with reference to predictive data analysis, one of ordinary skill in the art will recognize that the disclosed concepts may be used to perform other types of data analysis.

I. OVERVIEW

Embodiments of the present disclosure present evaluation techniques for improved machine learning model performance evaluation with respect to feature bias. The present disclosure describes a new bias detection framework that leverages new unitless dissimilarity metrics for evaluating machine learning bias with respect to different evaluation features and/or evaluation functions. The unitless dissimilarity metric of the present disclosure enables a bias detection framework that is generic, extensible, easy to use, and elaborative of feature bias exhibited by any type of machine learning model. The bias detection framework overcomes shortcomings with conventional benchmark evaluation frameworks by detecting bias in classification, regression, and/or other machine learning models using unitless dissimilarity metrics that are comparable across a plurality of different evaluation features, classes, and/or evaluation functions. Unlike conventional approaches, the unitless dissimilarity metrics of the present disclosure provide conclusive results that are extensible to any problem type.

The bias detection framework processes an evaluation dataset for a machine learning model to automatically handle exceptions associated with various evaluation functions and to remove anomalies from evaluation dataset. Moreover, continuous features within the evaluation dataset may be automatically bucketized into a plurality of defined feature classes. Once processed, the bias detection framework generates a respective unitless dissimilarity metric for a plurality of evaluation features within the evaluation dataset. Each respective unitless dissimilarity metric includes a scaled performance metric for the machine learning model that is transparent, comprehensive, and comparable across different evaluation functions for evaluating the machine learning model and/or different evaluation features within the evaluation dataset. The bias detection framework outputs a comprehensive bias analysis report and/or summary (e.g., machine learning verification output, class level verification output, and/or the like) for the machine learning model that includes a plurality of unitless dissimilarity metrics respectively generated for a plurality of evaluation features within an evaluation dataset and/or a plurality of evaluation functions for evaluating the performance of machine learning model. The unitless dissimilarity metric for a respective evaluation feature and/or evaluation function represents a percentage dissimilarity across all feature classes of the evaluation feature with respect to a particular evaluation function. Each unitless dissimilarity metric may be directly comparable and may be compared to example thresholds such as 10% and/or 30% that may define whether bias shown by a machine learning model is acceptable or unacceptable for a particular use case.

The unitless dissimilarity metric may be built using a coefficient of variation to satisfy the criteria of being a unitless and scaled measure. Unlike conventional evaluation metrics, the unitless dissimilarity metric uses a complete distribution of performance metrics rather than extreme values such as minimum and/or maximum values of a distribution. This enables the use of the unitless dissimilarity metric for detecting biases with respect to multi-level protected attributes. The unitless dissimilarity metric provides conclusive results and gives a degree/magnitude of biasness. Such results are comparable across a plurality of different existing performance metrics as applied to a plurality of different features within a dataset. This enables the prioritization of bias mitigation efforts in machine learning models depending on the use case.

Moreover, the unitless dissimilarity metric measures bias with respect to any feature class of any evaluation feature and does not require predefined privileged feature classes. In this respect, the unitless dissimilarity metric of the present disclosure provides class level insights for a respective evaluation feature of a dataset. The bias detection framework of the present disclosure makes use of the concept of outlier detection to identify a feature class towards which a machine learning model is behaving differently than other classes. This enables users to back track a group/level of a protected attributes that a machine learning model is biased towards to better tailor optimization efforts for improving machine learning performance.

Exemplary inventive and technologically advantageous embodiments of the present disclosure include: (i) new evaluation data structures that are cohesive, transparent, comparable across various evaluation functions and/or evaluation features, and that provide individual class level bias insights; (ii) techniques for generating sets of comparable evaluation data structures for various evaluation features of a data set using a plurality of different evaluation functions; and (iii) interactive user interfaces for providing comprehensive evaluation insights for machine learning models of any type.

The term "evaluation dataset" may refer to a data entity that describes contextual information for evaluating a machine learning model. The evaluation dataset may be based at least in part on the machine learning model. In some embodiments, the evaluation dataset may include historical, simulated, and/or testing inputs to a particular machine learning model. The inputs, for example, may include evaluation data objects. In addition, or alternatively, the evaluation dataset may include evaluation outputs and/or labels for the historical, simulated, and/or testing inputs. By way of example, the evaluation dataset may include a plurality of evaluation data objects describing a plurality historical, simulated, and/or testing inputs to a particular machine learning model and (i) a plurality of evaluation data object parameters, (ii) a plurality of evaluation labels, and/or (iii) a plurality of evaluation outputs for the plurality of evaluation data objects.

The techniques of the present disclosure are applicable to any type of machine learning model, algorithm, and/or the like. The inputs, outputs, and/or labels may be based at least in part on the type, purpose, and/or architecture of the particular machine learning model.

The term "machine learning model" may refer to a data entity that describes parameters, hyper-parameters, and/or defined operations of a machine learning model (e.g., model including at least one of one or more rule-based layers, one or more layers that depend on trained parameters, coefficients, and/or the like). A machine learning model may be trained to perform a classification, prediction, and/or any other computing task. The machine learning model may include one or more of any type of machine learning models including one or more supervised, unsupervised, and/or reinforcement learning models. In some embodiments, the machine learning model may include multiple models configured to perform one or more different stages of a classification, predictive, and/or the like computing task.

As one example, a machine learning model may include a machine learning classification model trained, using one or more supervisory training techniques, to output a classification output (and/or one or more contextual outputs such as a certainty level, etc.) predicted to correspond to an evaluation data object. The classification output, for example, may include a discrete value output for a particular evaluation data object. As described herein, in some embodiments, the evaluation dataset may include a plurality of historical classification outputs previously output by a machine learning classification model.

As another example, a machine learning model may include a machine learning regression model trained, using one or more supervisory training techniques, to output a prediction output (and/or one or more contextual outputs such as a certainty level, and/or the like) predicted to correspond to an evaluation data object. The prediction output, for example, may include a continuous and/or real value output for a particular evaluation data object. As described herein, in some embodiments, the evaluation dataset may include a plurality of historical prediction outputs previously output by a machine learning regression model.

The term "evaluation data object" may refer to a data entity that describes a particular historical, simulated, and/or testing input to a particular machine learning model. The evaluation data object may include a plurality of evaluation data object parameters that describe one or more attributes of the evaluation data object. By way of example, the evaluation data object may include a data entity and/or structure that groups a plurality of different attributes for a particular input. For example, the evaluation data object may include a unique identifier that is respectively associated with the plurality of evaluation data object parameters. The evaluation data object may depend on the machine learning model. As one example, an evaluation data object may include an input image for a machine learning image classification model. As other examples, an evaluation data object may include a patient and/or claim profile for a machine learning diagnosis classification model, machine learning diagnosis prediction model, and/or the like.

The term "evaluation data object parameter" may refer to a data entity that describes an attribute of an evaluation data object. For example, as described herein, the evaluation data object may be associated with a plurality of evaluation data object parameters that may be descriptive of a plurality of attributes for the evaluation data object. The plurality of attributes may be based at least in part on the machine learning model and may include one or more characteristics that may be relevant to the machine learning model. By way of example, the evaluation data object parameters may include contextual information such as patient demographic information, and/or the like for an input image, a patient/claim profile, and/or the like that are provided as inputs to a particular machine learning model.

The term "evaluation label" may refer to a data entity that describes a desired machine learning output for a machine learning model. The evaluation label, for example, may describe a target label or ground truth for an evaluation data object processed by a machine learning model. The evaluation label may be based at least in part on the machine learning model.

In one example embodiment, the evaluation label may include a target classification that describes a target and/or ground truth value for a machine learning classification model. The target classification may include a discrete value corresponding to a particular evaluation data object. The discrete value may be indicative of an accurate classification for the particular evaluation data object. In some embodiments, the evaluation dataset may include a plurality of target classifications respectively corresponding to the plurality of evaluation data objects.

In another example embodiment, the evaluation label may include a target prediction that describes a target and/or ground truth value for a machine learning regression model. The target prediction may include a continuous and/or real value corresponding to a particular evaluation data object. The continuous and/or real value may be indicative of an accurate prediction for the particular evaluation data object. In some embodiments, the evaluation dataset may include a plurality of target predictions respectively corresponding to the plurality of evaluation data objects.

The evaluation label may include any type of data structure (e.g., classification, prediction, categorization, and/or the like) depending on the machine learning model.

The term "evaluation output" may refer to a data entity that describes a machine learning output for a machine learning model. The evaluation output, for example, may describe an output of a machine learning model that is generated for an evaluation data object. In some embodiments, the evaluation dataset may include a plurality of evaluation outputs previously generated by a machine learning model for a plurality of evaluation data objects.

The evaluation output may be based at least in part on the machine learning model.

In one example embodiment, the evaluation output may include a classification output that describes a classification output from a machine learning classification model. The classification output may include a discrete value corresponding to a particular evaluation data object. The discrete value may be indicative of an actual classification previously output for the particular evaluation data object by a machine learning classification model. In some embodiments, the evaluation dataset may include a plurality of historical classification outputs respectively generated by a machine learning classification model for the plurality of evaluation data objects.

In another example embodiment, the evaluation output may include a prediction output that describes a prediction output from a machine learning regression model. The prediction output may include a continuous and/or real value corresponding to a particular evaluation data object. The continuous and/or real value may be indicative of an actual prediction previously output for the particular evaluation data object by a machine learning regression model. In some embodiments, the evaluation dataset may include a plurality of historical prediction outputs previously generated by a machine learning regression model for the plurality of evaluation data objects.

The evaluation output may include any type of data structure (e.g., classification, prediction, categorization, and/or the like) depending on the machine learning model.

The term "evaluation feature" may refer to a particular evaluation data object parameter that is utilized to evaluate the performance of a machine learning model. An evaluation feature may include any evaluation data object parameter that may be associated with a range (e.g., binary, continuous, and/or the like) of feature classes. The evaluation feature may include an evaluation data object parameter that may induce bias to a machine learning model depending on a respective feature class of the evaluation feature. This may include, for example, bias introduced through disproportional and/or otherwise insufficient training data that increases an accuracy of a machine learning model for one feature class at the expense of another feature class.

As one example, an evaluation feature may include a hospital feature for a machine learning model configured to predict a length of stay for a patient. In the event that the machine learning model is trained using a training data set that includes a majority of historical hospital visits at a particular hospital, the machine learning model may perform better for the particular hospital as opposed to others. In some embodiments, an evaluation feature may include a protected attribute such as gender, race, age, and/or the like. In such a case, the evaluation techniques of the present disclosure may ensure that machine learning models perform accurately for any feature class of a protected feature.

The term "feature class" may refer to a particular value for an evaluation data object parameter. For instance, a feature class may include a value for an evaluation feature. The feature class, for example, may include a particular hospital for a hospital feature. As other examples, a feature class may include a particular gender for a gender feature, a particular race for a race feature, a particular age for an age feature, and/or the like. In some embodiments, for example for continuous evaluation features, a feature class may be associated with a range of values (e.g., a bucket). By way of example, for an age feature, a feature class may be associated with a particular age range.

The term "evaluation function" may refer to a data entity that describes parameters, hyper-parameters, and/or defined operations of an algorithm, model, and/or the like for evaluating the performance of a machine learning model. An evaluation function, for example, may evaluate the performance of a respective machine learning model based at least in part on the inputs to, outputs from, and/or contextual information associated with the machine learning model.

The evaluation function may include any evaluation algorithm for any type of machine learning model. In some embodiments, for example, the evaluation function may include one or more classification evaluation functions for evaluating the performance of one or more machine learning classification models and/or one or more regression evaluation functions for evaluating the performance of one or more machine learning regression models.

The term "classification evaluation function" may refer to a type of evaluation function for evaluating the performance of machine learning classification models. A classification evaluation function may include any type and/or number of different evaluation algorithms. In some embodiments, as examples, the classification evaluation function may include one or more (i) equal opportunity algorithms, (ii) area under the receiver operating characteristic curve (AUROC) algorithms, (iii) false positive rate (FPR) algorithms, (iv) false negative rate (FNR) algorithms, (v) true negative rate (TNR) algorithms, (vi) false omission rate (FOR) algorithms, (vii) false discovery rate (FDR) algorithms, (viii) negative predicted value (NPV) algorithms, (ix) positive predicted value (PPV) algorithms, (x) Kappa score algorithms, (xi) balanced accuracy algorithms, and/or the like.

An equal opportunity algorithm, for example, may output a true positive rate (TPR) that is indicative of a probability that a positive result will be given by a machine learning model when a corresponding evaluation label is negative. An AUROC algorithm may output an AUROC value that may be indicative of a measure of the ability of a machine learning model to distinguish between feature classes of an evaluation feature. An FPR algorithm may output an FPR indicative of a probability that an actual positive will test positive. An FNR algorithm may output an FNR indicative of a probability that a true positive will be missed by the test. A TNR algorithm may output a TNR indicative of a probability that an actual negative will test negative. An FOR algorithm may output an FOR indicative of a fraction of the false negatives of a group within the predictive negative of the group. An FDR algorithm may output an FDR indicative of a fraction of the false positives of a group within the predictive positives of the group. An NPV algorithm may output an NPV indicative of a fraction of correctly predictive negative values out of the total negative predictive values. A PPV algorithm may output a PPV indicative of a fraction of correctly predictive positive values out of the total positive values. A Kappa score algorithm may output a Kappa score representative of the extent to which predictions made by a machine learning model are correct. A balanced accuracy algorithm may output a balanced accuracy score representative of a measure of the sensitivity and specificity of a machine learning model divided by two.

The term "regression evaluation function" may refer to a type of evaluation function configured to evaluate the performance of a machine learning regression model. A regression evaluation function may include any type and/or number of different evaluation algorithms. In some embodiments, as examples, the regression evaluation function may include one or more of (i) a root mean squared error (RMSE) algorithm, (ii) a mean absolute percentage error (MAPE) algorithm, (iii) an adjusted coefficient of determination algorithm, (iv) an explainable variance regression loss algorithm, (v) a mean squared log error (MSLE) algorithm, (vi) a mean poisson deviance regression loss algorithm, (vii) a mean gamma deviance regression loss algorithm, (viii) a mean inverse gaussian deviance regression loss algorithm, (ix) a D2 poisson score algorithm, (x) a D2 gaussian score algorithm, (xi) a D2 inverse gaussian score algorithm, (xii) a pinball loss of quantile regression algorithm, and/or the like.

The RMSE algorithm, for example, may output an RMSE that is the square root of the average of the set of squared differences in a plurality of prediction outputs and/or target predictions for a machine learning model. The MAPE algorithm may output a MAPE indicative of a relative dispersion of the AUROC score between groups of a plurality of prediction outputs and/or target predictions for a machine learning model. The adjusted coefficient of determination algorithm may output an adjusted coefficient of determination (e.g., Adjusted R2) which may be indicative of a percentage variation in y explained by x-variables, where points that do not fit the model are penalized. The explainable variance regression loss algorithm may output an explainable variance regression loss that is indicative of the proportion to which a mathematical model accounts for the variation of a given data set. The MSLE algorithm may output an MSLE that is indicative of a relative dispersion of the TNR between groups of a plurality of prediction outputs and/or target predictions for a machine learning model. The mean poisson deviance regression loss algorithm outputs a mean poisson deviance measure indicative of how well a machine learning model fits data which follow a poisson distribution. The mean gamma deviance regression loss algorithm outputs a mean gamma deviance measure that is indicative of how well a machine learning model fits data which follow a gamma distribution. The mean inverse gaussian deviance regression loss algorithm outputs a gamma deviance measure that is indicative of how well a machine learning model fits data which follow an inverse gamma distribution. The D2 poisson score algorithm outputs a generalization of an R2 score, where the squared error is generalized and replaced by a mean poisson deviance. The D2 gaussian score algorithm outputs a generalization of an R2 score, where the squared error is generalized and replaced by a mean gamma deviance. The D2 inverse gaussian score algorithm outputs a generalization of an R2 score, where the squared error is generalized and replaced by a mean inverse gamma deviance. The pinball loss of quantile regression algorithm outputs a pinball loss indicative of the predictive performance of quantile regression models.

The term "performance metric" may refer to a type of performance measure for evaluating the performance of a machine learning model. A performance metric may include an individual metric for a feature class of an evaluation feature. The performance metric may depend on the machine learning model and/or the evaluation function utilized to evaluate the performance of the machine learning model. In some embodiments, for example, a performance metric may include at least one of a: TPR, AUROC, FPR, FNR, TNR, FOR, FDR, NPV, PPV, Kappa score, balanced accuracy score, and/or the like. As another example, the performance metric may include at least one of an: RMSE, MAPE, Adjusted R2, explainable variance regression loss, MSLE, mean poisson deviance measure, mean gamma deviance measure, gamma deviance measure, D2 poisson score, D2 gaussian score, D2 inverse gaussian score, pinball loss, and/or the like.

The term "exception value" may refer to a data entity that describes a particular value associated with an evaluation data object that may impact the accuracy of a respective evaluation function. The exception values may be based at least in part on the respective evaluation function. In some embodiments, the exception value may be representative of a null and/or negative value and/or a zero value for an evaluation label and/or an evaluation output associated with an evaluation data object. By way of example, one or more regression evaluation functions and/or other evaluation functions may be error prone to null, negative, and/or zero values. These exception values may be identified to reduce evaluation errors for a machine learning model.

For example, an exception value may include an evaluation output and/or an evaluation label with a null and/or negative value. For instance, the exception values may include (i) a null/negative prediction output of the plurality of prediction outputs output by a machine learning regression model, and/or (ii) a null/negative target prediction of the plurality of target predictions for the machine learning regression model.

As another example, the exception value may include an evaluation output and/or an evaluation label with a zero value. For instance, the exception values may include (i) a zero prediction output of the plurality of prediction outputs output by a machine learning regression model, or (ii) a zero target prediction of the plurality of target predictions for the machine learning regression model.

The term "unitless dissimilarity metric" may refer to a data entity that describes a universally comparable metric indicative of a level of bias associated with an evaluation feature for a machine learning model. The unitless dissimilarity metric is based at least in part on a coefficient of variation (COV) for a distribution of machine learning performance metrics. The unitless dissimilarity metric uses a complete distribution of values rather than value extremes to evaluate a level of bias over a group of performance metrics with feature level insights.

The unitless dissimilarity metric includes a unitless parameter (e.g., a percentage, ratio, and/or the like) that is indicative of a degree and/or magnitude of bias for a machine learning model with respect to a particular evaluation function and a particular evaluation feature. The unitless dissimilarity metric is scaled such that a plurality of unitless dissimilarity metrics generated for a plurality of evaluation functions and evaluation features are directly comparable. In this way, the unitless dissimilarity metric provides conclusive results that enable the direct comparison of a machine learning model's bias with respect to multiple different evaluation features as evaluated by multiple different performance metrics.

By way of example, the unitless dissimilarity metric may include a percentage value that is indicative of a magnitude or level of bias of a machine learning model with respect to an evaluation feature and/or an evaluation function. In some embodiments, for example, the unitless dissimilarity metric may be representative of a magnitude or level of bias of a machine learning model with respect to an evaluation function relative to each of a plurality of different evaluation functions. In addition, or alternatively, the unitless dissimilarity metric may be representative of a magnitude or level of bias of a machine learning model with respect to an evaluation feature relative to each of a plurality of different evaluation features. For example, the unitless dissimilarity metric may be directly comparable to each of a plurality of unitless dissimilarity metrics respectively generated for each of a plurality of different evaluation functions and/or evaluation features.

The unitless dissimilarity metric may be generated based at least in part on (i) a performance metric generated for a feature class of an evaluation feature, (ii) an average performance measure for the evaluation feature, and (iii) a standard feature deviation measure for the evaluation feature. The unitless dissimilarity metric, for example, may include the ratio (or a percentage derived thereof) of the average performance measure divided by the standard feature deviation measure for the evaluation feature.

The term "average performance measure" may refer to a data entity that describes a component of a unitless dissimilarity metric. The average performance measure includes a parameter of an evaluation feature that describes an average value of a respective performance metric generated for each feature class of an evaluation feature using a respective evaluation function. For instance, the average performance measure may be representative of an average of each of the plurality of performance metrics generated for the plurality of feature classes of the evaluation feature. By way of example, the average performance measure may be denoted as avg, the number of feature classes for a respective evaluation feature may be denoted as N, and a respective performance metric may be denoted as ϰi, such that:

$$ave = \frac{1}{N}\sum_{i=0}^{N} x_i.$$

The term "standard feature deviation measure" may refer to a data entity that describes a component of a unitless dissimilarity metric. The standard feature deviation measure includes a parameter of an evaluation feature that describes an aggregate standard deviation for each respective performance metric generated for each respective feature class of an evaluation feature using an evaluation function. The standard feature deviation measure may include the square root of the sum of the squared deviation of each respective performance metric. As an example, an evaluation feature may include a first feature class with a corresponding first performance metric and a second feature class with a corresponding second performance metric. A first feature deviation measure (e.g., a squared deviation), may include a first squared deviation between the first performance metric and an average performance measure for the evaluation feature. A second feature deviation measure (e.g., another squared deviation), may include a second squared deviation between the second performance metric and the average performance measure for the evaluation feature. The standard feature deviation measure for the evaluation feature may include a square root of an aggregated feature deviation measure that includes the sum of at least the first feature deviation measure and the second feature deviation measure.

By way of example, the feature deviation measure, sqr $dev_i$, of a respective performance metric, $x_i$ may be:

$$sqr\ dev_i = (x_i - \text{avg})^2.$$

The standard feature deviation measure, std dev, of the evaluation feature may be:

$$std\ dev = \sqrt{\sum_{i=0}^{N} sqr\ dev_i}.$$

The term "feature class deviation measure" may refer to a data entity that describes a component of a feature class level parameter for evaluating a machine learning model's bias with respect to individual feature classes of an evaluation feature. The feature class deviation measure for a respective feature class may include an absolute deviation of a performance metric for the feature class from an average performance measure for the evaluation feature. By way of example, feature class deviation measure, abs $dev_i$, for a respective performance metric, $x_i$, may be found by:

$$abs\ dev_i = \text{absolute}(x_i - \text{avg}).$$

The term "class contribution metric" may refer to a data entity that describes a feature class level parameter for evaluating a machine learning model's bias with respect to individual feature classes of an evaluation feature. The class contribution metric may be representative of a contribution of a respective feature class deviation measure to a unitless dissimilarity metric generated for an evaluation feature. The class contribution metric, for example, may describe a level and/or magnitude of bias of a machine learning model with respect to an individual feature class of the evaluation feature.

A class contribution metric for a respective feature class may include a percentage mean deviation of a performance metric for a feature class from an average performance measure for the evaluation feature. By way of example, a class contribution metric, fc $dev_i$, for a respective performance metric, $x_i$, a may be found by:

$$fc\ dev_i = ((abs(x_i - \text{avg}))/\text{avg})*100; \text{ or}$$

$$fc\ dev_i = (abs\ dev/\text{avg})*100.$$

The term "machine learning verification output" may refer to a data entity that describes a performance of a machine learning model. The machine learning verification output may include an indication (e.g., a green/red/yellow marker, a text prompt, and/or the like) of whether the performance machine learning model achieves performance criteria for deploying the machine learning model for one or more different use cases. The indication may include a conclusive, easy to interpret, and extensive verification and/or nonverification of at least a portion of a machine learning model. In some embodiments, a machine learning model may be trained to optimize the machine learning verification output.

The machine learning verification output may be based at least in part on at least one unitless dissimilarity metric generated for the machine learning model. For example, the machine learning verification output may include an indication of a unitless dissimilarity metric generated for the machine learning model. In some embodiments, the machine learning verification output may include contextual indicators for a respective unitless dissimilarity metric that describe whether the unitless dissimilarity metric is acceptable. The contextual indicators, for example, may be based at least in part on a performance threshold associated with a particular evaluation feature and/or evaluation function.

In some embodiments, the machine learning verification output for a machine learning model may include an evaluation report interface that includes a plurality of different indications respectively describing a plurality of different unitless dissimilarity metrics generated for the machine learning model. The plurality of different unitless dissimilarity metrics may respectively correspond to each of a plurality of different evaluation features and/or evaluation functions. For example, the machine learning verification output may include a first indication of a first unitless dissimilarity metric for the first evaluation feature, a second indication of the second unitless dissimilarity metric for a second evaluation feature, and/or the like. In addition, or alternatively, the machine learning verification output may include a first indication of a first unitless dissimilarity metric for the first evaluation function, a second indication of the second unitless dissimilarity metric for a second evaluation function, and/or the like.

Each of the plurality of unitless dissimilarity metrics may be representative of a magnitude or level of bias of the machine learning model with respect to an evaluation feature/evaluation function relative to each of the plurality of different evaluation features/evaluation functions identified for a particular use case. Each of the plurality of unitless dissimilarity metrics for each of the plurality of different evaluation features/evaluation functions may be directly comparable.

In some embodiments, the evaluation report interface may include one or more interactive widgets. The one or more interactive widgets may correspond to one or more respective unitless dissimilarity metrics. By way of example, the one or more interactive widgets may accept user input and, responsive to the user input, initiate the presentation of additional information for a respective unitless dissimilarity metric such as, for example, a class level verification output.

The term "class level verification output" may refer to a data entity that describes a performance of a machine learning model with respect to an individual feature class of an evaluation feature. By way of example, the class level verification output may include an indication of a class contribution metric for a respective feature class of an evaluation feature. In some embodiments, the class level verification output may include a respective class contribution metric for each feature class of an evaluation feature.

II. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a nonvolatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a non-transitory computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example system architecture 100 for performing predictive data analysis operations and for performing one or more evaluation-based actions (e.g., generating corresponding user interface data) for machine learning models. The system architecture 100 includes a predictive computing system 102 comprising a predictive computing entity 104 configured to generate predictive outputs that may be used to perform one or more evaluation-based actions. The predictive computing system 102 may communicate with one or more external computing entities 106 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to generate a for evaluating the performance of a machine learning model.

The system architecture 100 includes a storage subsystem 108 configured to store at least a portion of the data utilized by the predictive computing system 102. The predictive computing entity 104 may be in communication with one or more external computing entities 106. The predictive computing entity 104 may be configured to execute one or more computer-implemented instructions stored in the storage subsystem 108 to perform one or more of the evaluation-based actions described herein. In some embodiments, the predictive computing entity 104 may train one or more machine learning models (e.g., unsupervised, supervised, and/or the like) based at least in part on training data store residing in the storage subsystem 108.

The storage subsystem 108 may be configured to store a model definition data store for one or more machine learning models, a training data store for training the machine learning models, and/or an evaluation data store for evaluating the performance of the machine learning models. The predictive computing entity 104 may be configured to receive requests and/or data from external computing entities 106, process the requests and/or data to generate predictive and/or evaluative outputs (e.g., unitless dissimilarity metrics), and provide the predictive and/or evaluative outputs to the external computing entities 106. The external computing entity 106 may periodically update/provide raw input data (e.g., structured feature data) to the predictive computing system 102. The external computing entities 106 may further generate user interface data (e.g., one or more data objects) corresponding to the predictive and/or evaluative outputs and may provide (e.g., transmit, send and/or the like) the user interface data corresponding with the predictive and/or evaluative outputs for presentation to user computing entities operated by end-users.

The storage subsystem 108 may be configured to store at least a portion of the data utilized by the predictive computing entity 104 to perform predictive data analysis steps/operations and tasks. The storage subsystem 108 may be configured to store at least a portion of operational data and/or operational configuration data including operational instructions and parameters utilized by the predictive computing entity 104 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive computing entity 104 according to one embodiment of the present disclosure. In general, the terms computing entity, computer, entity, device, system, and/or similar words used herein interchangeably may refer to, for example, one or more computers, computing entities, desktops, mobile phones, tablets, notebooks, laptops, distributed systems, kiosks, input terminals, servers or server networks, blades, gateways, switches, processing devices, processing entities, processors, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating, generating, monitoring, evaluating, comparing, and/or similar terms used herein interchangeably. In one embodiment, these functions, steps/operations, and/or processes may be performed on data, content, information, and/or similar terms used herein interchangeably.

As shown in FIG. 2, in one embodiment, the predictive computing entity 104 may include or be in communication with a processing element 202 (also referred to as processors, processing circuitry, and/or similar terms used herein interchangeably) that communicate with other elements within the predictive computing entity 104 via a bus, for example. As will be understood, the processing element 202 may be embodied in a number of different ways and may include at least one processor, one or more processors, or a plurality of processors.

For example, the processing element 202 may be embodied as one or more complex programmable logic devices (CPLDs), microprocessors, multi-core processors, coprocessing entities, application-specific instruction-set processors (ASIPs), microcontrollers, and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 202 may be configured for a particular use or configured to execute instructions stored in volatile or non-volatile media or otherwise accessible to the processing element 202. As such, whether configured by hardware or computer program products, or by a combination thereof, the processing element 202 may be capable of performing steps or operations according to embodiments of the present disclosure when configured accordingly.

In one embodiment, the predictive computing entity 104 may further include or be in communication with non-volatile memory 204 (also referred to as non-volatile storage, memory, memory storage, memory circuitry and/or similar terms used herein interchangeably). In one embodiment, the non-volatile memory 204 may include at least one non-volatile memory device, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that are stored in a non-transitory computer-readable storage medium using one or more database models, such as a hierarchical database model, network model, relational model, entity-relationship model, object model, document model, semantic model, graph model, and/or the like.

In one embodiment, the predictive computing entity 104 may further include or be in communication with volatile memory 206 (also referred to as volatile storage, memory, memory storage, memory circuitry and/or similar terms used herein interchangeably). In one embodiment, the volatile memory 206 may also include at least one volatile memory device, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memory 206 may be used to store at least portions of the databases, database instances, database management systems, data, applications, programs, program modules, scripts, source code, object code, byte code, compiled code, interpreted code, machine code, executable instructions, and/or the like being executed by, for example, the processing element 202. Thus, the databases, database instances, database management systems, data, applications, programs, program modules, scripts, source code, object code, byte code, compiled code, interpreted code, machine code, executable instructions, and/or the like may be used to control certain embodiments of the operation of the predictive computing entity 104 with the assistance of the processing element 202 and operating system.

In some embodiments, the predictive computing entity 104 may include a network interface 208 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol.

Similarly, the predictive computing entity 104 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 804.11 (Wi-Fi), Wi-Fi Direct, 804.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive computing entity 104 may include or be in communication with one or more input elements, such as a keyboard input, a mouse input, a touch screen/display input, motion input, movement input, audio input, pointing device input, joystick input, keypad input, and/or the like. The predictive computing entity 104 may also include or be in communication with one or more output elements (not shown), such as audio output, video output, screen/display output, motion output, movement output, and/or the like.

Exemplary External Computing Entity

FIG. 3 provides an illustrative schematic representative of an example computing entity 302 that may be used in conjunction with embodiments of the present disclosure. In general, the terms device, system, computing entity, entity, and/or similar words used herein interchangeably may refer to, for example, one or more computers, computing entities, desktops, mobile phones, tablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. The example computing entity 302 may include the predictive computing entity 104 and/or a respective external computing entity of the external computing entities 106 illustrated by FIG. 1 and may be operated by various parties. As shown in FIG. 3, a computing entity 302 may include an antenna 304, a transmitter 306 (e.g., radio), a receiver 308 (e.g., radio), and a processing element 310 (e.g., CPLDs, microprocessors, multi-core processors, coprocessing entities, ASIPs, microcontrollers, and/or controllers) that provides signals to and receives signals from the transmitter 306 and receiver 308, correspondingly.

The signals provided to and received from the transmitter 306 and the receiver 308, correspondingly, may include signaling information/data in accordance with air interface standards of applicable wireless systems. In this regard, the computing entity 302 may be capable of operating with one or more air interface standards, communication protocols, modulation types, and access types. More particularly, the computing entity 302 may operate in accordance with any of a number of wireless communication standards and protocols, such as those described above with regard to the predictive computing entity 104. In a particular embodiment, the computing entity 302 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 302 may operate in accordance with multiple wired communication standards and protocols, such as those described above with regard to the predictive computing entity 104 via a network interface 312.

Via these communication standards and protocols, the computing entity 302 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing entity 302 may also download changes, add-ons, and updates, for instance, to its firmware, software (e.g., including executable instructions, applications, program modules), and operating system.

According to one embodiment, the computing entity 302 may include location determining embodiments, devices, modules, functionalities, and/or similar words used herein interchangeably. For example, the computing entity 302 may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the computing entity's 302 position in connection with a variety of other systems, including cellular towers, Wi-Fi access points, and/or the like. Similarly, the computing entity 302 may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The computing entity 302 may also comprise an output device 314 such as a user interface (that may include a display coupled to a processing element 310) and/or a user input device 316 such as a user interface (coupled to a processing element 310). For example, the user interface may be a user application, browser, user interface, and/or similar words used herein interchangeably executing on and/or accessible via the computing entity 302 to interact with and/or cause display of information/data from the predictive computing entity 104, as described herein. The user input interface may comprise any of a number of devices or interfaces allowing the computing entity 302 to receive data, such as a keypad (hard or soft), a touch display, voice/speech or motion interfaces, or other input device. In embodiments including a keypad, the keypad may include (or cause display of) the conventional numeric (0-9) and related keys (#, *), and other keys used for operating the computing entity 302 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The computing entity 302 may also include volatile memory 318 and/or nonvolatile memory 320, which may be embedded and/or may be removable. For example, the nonvolatile memory 320 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 318 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the computing entity 302. As indicated, this may include a user application that is resident on the entity or accessible through a browser or other user interface for communicating with the computing entity 302 and/or various other computing entities.

In another embodiment, the computing entity 302 may include one or more components or functionality that are the same or similar to those of the predictive computing entity 104, as described in greater detail above. As will be recognized, these frameworks and descriptions are provided for exemplary purposes only and are not limiting to the various embodiments.

In various embodiments, the computing entity 302 may be embodied as an artificial intelligence (AI) computing entity, such as an Amazon Echo, Amazon Echo Dot, Amazon Show, Google Home, and/or the like. Accordingly, the computing entity 302 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

As described below, various embodiments of the present disclosure leverage machine learning evaluation techniques and new evaluation metrics to make important technical contributions to the performance, evaluation, and verification of machine learning applications.

IV. EXEMPLARY SYSTEM OPERATIONS

As described below, various embodiments of the present disclosure leverage new evaluation frameworks and evaluation data structures to make important technical contributions to machine learning evaluation techniques.

FIG. 4 provides a flowchart diagram of an example process 400 for evaluating potential bias in machine learning models in accordance with some embodiments discussed herein. The flowchart diagram depicts a new evaluation framework for generating insights for a machine learning model based at least in part on an evaluation dataset for the machine learning model. The evaluation framework may be implemented by one or more computing devices, entities and/or systems described herein. For example, the predictive computing entity 104 may utilize the evaluation framework to overcome the various limitations with conventional evaluation mechanisms for machine learning models that lack the comprehensibility, conclusivity, and transparency provided by the evaluation metrics described by the present disclosure.

FIG. 4 illustrates an example process 400 for explanatory purposes. Although the example process 400 depicts a particular sequence of steps/operations, the sequence may be altered without departing from the scope of the present disclosure. For example, some of the steps/operations depicted may be performed in parallel or in a different sequence that does not materially impact the function of the process 400. In other examples, different components of an example device or system that implements the process 400 may perform functions at substantially the same time or in a specific sequence.

According to some examples, the process 400 includes, at step/operation 402, receiving an evaluation dataset for a machine learning model. For example, the predictive computing entity 104 may receive the evaluation dataset for the machine learning model. The evaluation dataset may include a plurality of evaluation data objects associated with one or more different feature classes of an evaluation feature. The predictive computing entity 104 may perform one or more preprocessing operations for the evaluation dataset to facilitate the evaluation of the machine learning model using the evaluation dataset.

For example, FIG. 5 provides a block diagram for example data processing techniques in accordance with some embodiments discussed herein. The block diagram of FIG. 5 depicts one or more processing stages for evaluation dataset 506. In some embodiments, the one or more processing stages may include one or more steps/operations performed by the predictive computing entity 104. By way of example, the one or more steps/operations may include one or more sub-steps/operations of the process 400.

At a first processing stage, evaluation dataset 506 may be received by the predictive computing entity 104. The evaluation dataset 506 may include a data entity that describes contextual information for evaluating the machine learning model. The evaluation dataset 506, for example, may be based at least in part in the machine learning model. In some embodiments, the evaluation dataset 506 may include historical, simulated, and/or testing inputs to a particular machine learning model. In addition, or alternatively, the evaluation dataset 506 may include outputs and/or labels for the historical, simulated, and/or testing inputs. By way of example, the evaluation dataset 506 may include a plurality of evaluation data objects 508 describing a plurality of historical, simulated, and/or testing inputs to a particular machine learning model and (i) a plurality of evaluation data object parameters, (ii) a plurality of evaluation labels, and/or (iii) a plurality of evaluation outputs for the plurality of evaluation data objects 508.

The techniques of the present disclosure may be applicable to any type of machine learning model, algorithm, and/or the like. The inputs, outputs, and/or labels may be based at least in part on the type, purpose, and/or architecture of the particular machine learning model.

By way of example, the machine learning model may refer to a data entity that describes parameters, hyper-parameters, and/or defined operations of a machine learning model (e.g., model including at least one of one or more rule-based layers, one or more layers that depend on trained parameters, and/or the like). The machine learning model may be trained to perform a classification, prediction, and/or any other computing task. The machine learning model may include one or more of any type of machine learning models including one or more supervised, unsupervised, and/or reinforcement learning models. In some embodiments, the machine learning model may include multiple models configured to perform one or more different stages of a classification, predictive, and/or any other computing task.

As one example, a machine learning model may include a machine learning classification model trained, using one or more supervisory training techniques, to output a classification output (and/or one or more contextual outputs such as a certainty level, and/or the like) predicted to correspond to an evaluation data object. In such a case, the plurality of evaluation outputs for the plurality of evaluation data objects 508 may include a plurality of classification outputs. A classification output, for example, may include a discrete value output for a particular evaluation data object. In some embodiments, the evaluation dataset 506 may include a plurality of historical classification outputs previously output by a machine learning classification model.

As another example, a machine learning model may include a machine learning regression model trained, using one or more supervisory training techniques, to output a prediction output (and/or one or more contextual outputs such as a certainty level, and/or the like) predicted to correspond to an evaluation data object. In such a case, the plurality of evaluation outputs for the plurality of evaluation data objects 508 may include a plurality of prediction outputs. A prediction output, for example, may include a continuous and/or real value output for a particular evaluation data object. In some embodiments, the evaluation dataset 506 may include a plurality of historical prediction outputs previously output by a machine learning regression model.

An evaluation data object 508 includes a data entity that describes a particular historical, simulated, and/or testing input to a particular machine learning model. The evaluation data object 508 may include a plurality of evaluation data object parameters that describe one or more attributes of the evaluation data object 508. By way of example, the evaluation data object 508 may include a data entity and/or structure that groups a plurality of different attributes for a particular input. For example, the evaluation data object 508 may include a unique identifier that is respectively associated with the plurality of evaluation data object parameters. The evaluation data object 508 may depend on the machine learning model. As one example, an evaluation data object 508 may include an input image for a machine learning image classification model. As other examples, an evaluation data object 508 may include a patient and/or claim profile for a machine learning diagnosis classification model, machine learning diagnosis prediction model and/or the like.

Each of the evaluation data objects 508 may include a plurality of evaluation data object parameters that respectfully describe an attribute of an evaluation data object and/or may be associated with one or more evaluation labels and/or evaluation outputs.

For example, as described herein, the evaluation data objects 508 may be associated with a plurality of evaluation data object parameters that may be descriptive of a plurality of attributes for the evaluation data objects 508. The plurality of attributes may be based at least in part on a machine learning model and may include one or more characteristics that may be relevant to the machine learning model. By way of example, the evaluation data object parameters may include contextual information such as patient demographic information, and/or the like for an input image, a patient/claim profile, and/or the like that are provided as inputs to a machine learning model.

As another example, the evaluation data objects 508 may be associated with evaluation labels that may describe a target label or ground truth for an evaluation data object 508 processed by a machine learning model. The evaluation label may be based at least in part on the machine learning model.

In one example embodiment, the evaluation label may include a target classification that describes a target and/or ground truth value for a machine learning classification model. The target classification may include a discrete value corresponding to a particular evaluation data object. The discrete value may be indicative of an accurate classification for the particular evaluation data object. In some embodiments, the evaluation dataset may include a plurality of target classifications respectively corresponding to the plurality of evaluation data objects 508.

In another example embodiment, the evaluation label may include a target prediction that describes a target and/or ground truth value for a machine learning regression model.

The target prediction may include a continuous and/or real value corresponding to a particular evaluation data object. The continuous and/or real value may be indicative of an accurate prediction for the particular evaluation data object. In some embodiments, the evaluation dataset 506 may include a plurality of target predictions respectively corresponding to the plurality of evaluation data objects 508.

The evaluation label may include any type of data structure (e.g., classification, prediction, categorization, and/or the like) depending on the machine learning model.

As yet another example, the evaluation data objects 508 may be associated with evaluation outputs that describe actual machine learning outputs for a machine learning model. An evaluation output, for example, may describe an output of a machine learning model that is generated for an evaluation data object. In some embodiments, the evaluation dataset 506 may include a plurality of evaluation outputs previously generated by a machine learning model for the plurality of evaluation data objects 508.

The evaluation output may be based at least in part on the machine learning model.

In one example embodiment, the evaluation output may include a classification output that describes a classification output from a machine learning classification model. The classification output may include a discrete value corresponding to a particular evaluation data object. The discrete value may be indicative of an actual classification previously output for the particular evaluation data object by a machine learning classification model. In some embodiments, the evaluation dataset 506 may include a plurality of historical classification outputs respectively generated by a machine learning classification model for the plurality of evaluation data objects 508.

In another example embodiment, the evaluation output may include a prediction output that describes a prediction output from a machine learning regression model. The prediction output may include a continuous and/or real value corresponding to a particular evaluation data object. The continuous and/or real value may be indicative of an actual prediction previously output for the particular evaluation data object by a machine learning regression model. In some embodiments, the evaluation dataset may include a plurality of historical prediction outputs previously generated by a machine learning regression model for the plurality of evaluation data objects 508. The evaluation output may include any type of data structure (e.g., classification, prediction, categorization, and/or the like) depending on the machine learning model.

At second processing stage 502, an evaluation feature from the evaluation dataset 506 may be processed by the predictive computing entity 104. For example, the evaluation data objects 508 of the evaluation dataset 506 may include a plurality of evaluation features. An evaluation feature may include a particular evaluation data object parameter that is utilized to evaluate the performance of a machine learning model. An evaluation feature may include any evaluation data object parameter that may be associated with a range (e.g., binary, continuous, and/or the like) of feature classes. The evaluation feature may include an evaluation data object parameter that may induce bias to a machine learning model depending on a respective feature class of the evaluation feature. This may include, for example, bias introduced through disproportional and/or otherwise insufficient training data that increases an accuracy of a machine learning model for one feature class at the expense of another feature class.

As one example, an evaluation feature may include a hospital feature for a machine learning model configured to predict a length of stay for a patient. In the event that the machine learning model is trained using a training data set that includes a majority of historical hospital visits at a particular hospital, the machine learning model may perform better for the particular hospital as opposed to others. In some embodiments, an evaluation feature may include a protected attribute such as gender, race, age, and/or the like. In such a case, the evaluation techniques of the present disclosure may ensure that machine learning models perform accurately for any feature class of a protected feature.

A feature class, for example, may describe a particular value for an evaluation data object parameter such as the evaluation feature. For instance, a feature class may include a value for the evaluation feature. The feature class, for example, may include a particular hospital for a hospital feature. As other examples, a feature class may include a particular gender for a gender feature, a particular race for a race feature, a particular age for an age feature, and/or the like. In some embodiments, for example for continuous evaluation features, a feature class may be associated with a range of values (e.g., a bucket). By way of example, for an age feature, a feature class may be associated with a particular age range.

At the second processing stage 502, the predictive computing entity 104 may determine whether an evaluation feature is a continuous feature. In the event that the evaluation feature is not a continuous feature, the predictive computing entity 104 may proceed to a third processing stage 504. In the event that the evaluation feature is a continuous feature, the predictive computing entity 104 may perform one or more continuous feature handling operations 510.

The one or more continuous feature handling operations 510 may include bucketizing a plurality of different evaluation feature value ranges into one or more different feature classes for the continuous evaluation feature. Each feature class, for example, may include a class bucket that defines a range of class values for an evaluation feature. A respective feature class may include a group of feature classes with a class value within the range of class values.

In some embodiments, in response to determining that an evaluation feature is a continuous feature, the predictive computing entity 104 may automatically determine a plurality of different feature classes for the continuous evaluation feature based at least in part on a range of evaluation feature values for the evaluation feature. For instance, the predictive computing entity 104 may determine a range of class values for the evaluation feature. The range of class values may be based at least in part on a minimum class value and/or a maximum class value of the evaluation feature. The predictive computing entity 104 may generate a plurality of feature classes for the evaluation feature such that each of the plurality of class values are evenly distributed among the plurality of feature classes.

In some embodiments, the predictive computing entity 104 may receive grouping data indicative of one or more feature classes for a continuous evaluation feature. By way of example, the grouping data may be indicative of a number of feature classes for a continuous evaluation feature. In addition, or alternatively, the grouping data may be indicative of one or more customized ranges for one or more feature classes of the continuous evaluation feature. In some embodiments, the grouping data may be based at least on user input. By way of example, the grouping data may be provided by a user query to initialize the evaluation framework described herein.

At the third processing stage 504, the predictive computing entity 104 may determine whether a data anomaly is present in the evaluation dataset 506. In the event that a data anomaly is not present, the predictive computing entity 104 may proceed to an exception handling stage 512. In the event that a data anomaly is present, the predictive computing entity 104 may perform one or more anomaly handling operations 514.

The one or more anomaly handling operations 514 may include detecting, using one or more anomaly detection frameworks, one or more abnormalities in the evaluation dataset 506. To do so, the predictive computing entity 104 may generate an abnormality dictionary indicative of a plurality of feature categories within the evaluation dataset 506 with a historical correlation to errors for a respective machine learning model. The predictive computing entity 104 may identify one or more of the evaluation data objects 508 associated with a feature category identified by the abnormality dictionary and remove the evaluation data object from the evaluation dataset 506.

At the exception handling stage 512, the predictive computing entity 104 may determine whether one or more exception values are present within the evaluation dataset 506. In the event that one or more exception values are not present, the predictive computing entity 104 may proceed to step/operation 404 of the process 400. In the event that one or more exception values are present, the predictive computing entity 104 may perform one or more exception handling operations. The predictive computing entity 104 may then proceed to step/operation 404 of the process 400. The exception handling operations may include modifying one or more values of the evaluation dataset 506 and/or identifying a subset of valid evaluation functions for a machine learning model to compensate for the exception values.

The exception handling stage 512 may be selectively performed based at least in part on the machine learning model. For example, the one or more exception values may only be present for evaluation functions associated with one or more different types of machine learning models. In some embodiments, for example, the exception values may correspond to regression evaluation functions utilized to evaluate a performance of machine learning regression models. In such a case, the exception handling stage 512 may be selectively performed when evaluating machine learning regression models and not performed when evaluating other machine learning models such as, for example, machine learning classification models.

FIG. 6 provides a flowchart diagram of an example process 600 for handling data exceptions in accordance with some embodiments discussed herein. FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence. The process 600 may include a plurality of operations subsequent to step/operation 402 of FIG. 4, where the process 400 includes receiving an evaluation dataset for a machine learning model. In addition, or alternatively, the process 600 may include one or more sub-operations of step/operation 402 of FIG. 4.

According to some examples, the process 600 includes, at step/operation 602, receiving data indicative of a plurality of evaluation functions for evaluating the performance of a machine learning model. For example, the predictive computing entity 104 may receive data indicative of the plurality of evaluation functions for evaluating the performance of the machine learning model. In some embodiments, the predictive computing entity 104 may identify at least one evaluation function for evaluating the machine learning model based at least in part on an evaluation dataset, an evaluation feature, and the plurality of evaluation functions.

An evaluation function may describe parameters, hyperparameters, and/or defined operations of an algorithm, model, and/or the like for evaluating the performance of a machine learning model. An evaluation function, for example, may evaluate the performance of a respective machine learning model based at least in part on the inputs to, outputs from, and/or contextual information associated with the machine learning model. The evaluation function may include any evaluation algorithm for any type of machine learning model. In some embodiments, for example, the evaluation function may include one or more classification evaluation functions for evaluating the performance of one or more machine learning classification models and/or one or more regression evaluation functions for evaluating the performance of one or more machine learning regression models.

A classification evaluation function, for example, may include a type of evaluation function for evaluating the performance of machine learning classification models. A classification evaluation function may include any type and/or number of different evaluation algorithms. In some embodiments, as examples, the classification evaluation function may include one or more (i) equal opportunity algorithms, (ii) AUROC algorithms, (iii) FPR algorithms, (iv) FNR, algorithms, (v) TNR algorithms, (vi) FOR algorithms, (vii) FDR algorithms, (viii) NPV algorithms, (ix) PPV algorithms, (x) Kappa score algorithms, (xi) balanced accuracy algorithms, and/or the like.

An equal opportunity algorithm, for example, may output a true positive rate (TPR) that is indicative of a probability that a positive result will be given by a machine learning model when a corresponding evaluation label is negative. An AUROC algorithm may output an AUROC value that may be indicative of a measure of the ability of a machine learning model to distinguish between feature classes of an evaluation feature. An FPR algorithm may output an FPR indicative of a probability that an actual positive will test positive. An FNR algorithm may output an FNR indicative of a probability that a true positive will be missed by the test. A TNR algorithm may output a TNR indicative of a probability that an actual negative will test negative. An FOR algorithm may output an FOR indicative of a fraction of the false negatives of a group within the predictive negative of the group. An FDR algorithm may output an FDR indicative of a fraction of the false positives of a group within the predictive positives of the group. An NPV algorithm may output an NPV indicative of a fraction of correctly predictive negative values out of the total negative predictive values. A PPV algorithm may output a PPV indicative of a fraction of correctly predictive positive values out of the total positive values. A Kappa score algorithm may output a Kappa score representative of the extent to which predictions made by a machine learning model are correct. A balanced accuracy algorithm may output a balanced accuracy score representative of a measure of the sensitivity and specificity of a machine learning model divided by two.

In some embodiments of the present disclosure, the machine learning model may include a machine learning classification model. In such a case, the plurality of evaluation data objects may be associated with a plurality of target classifications and an evaluation function may include a classification evaluation function configured to evaluate a performance of the machine learning classification model based at least in part on a comparison between (i) a plurality of evaluation outputs (e.g., classification outputs, and/or the like) generated, using the machine learning classification model, for the plurality of evaluation data objects and (ii) the plurality of target classifications associated with the plurality of evaluation data objects. In some embodiments, the predictive computing entity 104 may receive data indicative of a plurality of classification evaluation function and identify an evaluation function from the plurality of classification evaluation functions for evaluating the machine learning classification model.

A regression evaluation function may include a type of evaluation function configured to evaluate the performance of a machine learning regression model. A regression evaluation function may include any type and/or number of different evaluation algorithms. In some embodiments, as examples, the regression evaluation function may include one or more (i) RMSE algorithm, (ii) a MAPE algorithm, (iii) an adjusted coefficient of determination algorithm, (iv) an explainable variance regression loss algorithm, (v) a MSLE, (vi) a mean poisson deviance regression loss algorithm, (vii) a mean gamma deviance regression loss algorithm, (viii) a mean inverse gaussian deviance regression loss algorithm, (ix) a D2 poisson score algorithm, (x) a D2 gaussian score algorithm, (xi) a D2 inverse gaussian score algorithm, (xii) a pinball loss of quantile regression algorithm, and/or the like.

The RMSE algorithm, for example, may output an RMSE that is the square root of the average of the set of squared differences in prediction outputs and/or target predictions for a machine learning model. The MAPE algorithm may output a MAPE indicative of a relative dispersion of the AUROC score between groups of prediction outputs and/or target predictions for a machine learning model. The adjusted coefficient of determination algorithm may output an adjusted coefficient of determination (e.g., Adjusted R2) which may be indicative of a percentage variation in y explained by x-variables, where points that do not fit the model are penalized. The explainable variance regression loss algorithm may output an explainable variance regression loss that is indicative of the proportion to which a mathematical model accounts for the variation of a given data set. The MSLE algorithm may output an MSLE that is indicative of a relative dispersion of the TNR between groups of prediction outputs and/or target predictions for a machine learning model. The mean poisson deviance regression loss algorithm outputs a mean poisson deviance measure indicative of how well a machine learning model fits data which follow a poisson distribution. The mean gamma deviance regression loss algorithm outputs a mean gamma deviance measure that is indicative of how well a machine learning model fits data which follow a gamma distribution. The mean inverse gaussian deviance regression loss algorithm outputs a gamma deviance measure that is indicative of how well a machine learning model fits data which follow an inverse gamma distribution. The D2 poisson score algorithm outputs a generalization of an R2 score, where the squared error is generalized and replaced by a mean poisson deviance. The D2 gaussian score algorithm outputs a generalization of an R2 score, where the squared error is generalized and replaced by a mean gamma deviance. The D2 inverse gaussian score algorithm outputs a generalization of an R2 score, where the squared error is generalized and replaced by a mean inverse gamma deviance. The pinball loss of quantile regression algorithm outputs a pinball loss indicative of the predictive performance of quantile regression models.

In some embodiments of the present disclosure, the machine learning model may include a machine learning regression model. In such a case, the plurality of evaluation data objects may be associated with a plurality of target predictions and the evaluation function may include a regression evaluation function configured to evaluate a performance of the machine learning regression model based at least in part on a comparison between (i) a plurality of evaluation outputs (e.g., prediction outputs, and/or the like) generated, using the machine learning regression model, for the plurality of evaluation data objects and (ii) the plurality of target predictions associated with the plurality of evaluation data objects. In some embodiments, the predictive computing entity 104 may receive data indicative of a plurality of regression evaluation functions and identify an evaluation function from the plurality of regression evaluation functions for evaluating the machine learning regression model.

According to some examples, the process 600 includes, at step/operation 604, identifying one or more exception values associated with the plurality of evaluation data objects. For example, the predictive computing entity 104 may identify the one or more exception values.

An exception value, for example, may include a particular value associated with an evaluation data object that may impact the accuracy of a respective evaluation function. The exception values may be based at least in part on the respective evaluation function. In some embodiments, the exception value may be representative of a null, zero, or negative value for an evaluation label and/or an evaluation output associated with an evaluation data object.

For example, an exception value may include an evaluation output and/or an evaluation label with a null and/or negative value. For instance, the exception values may include (i) a null/negative classification/prediction output by a machine learning model and/or (ii) a null/negative target classification/prediction for the machine learning model. In some embodiments, for example, the exception values may include negative prediction values associated with a machine learning regression model. By way of example, the exception values may include one or more negative prediction outputs and/or one or more negative target predictions associated with a machine learning regression model.

As another example, the exception value may include an evaluation output and/or an evaluation label with a zero value. For instance, the exception values may include (i) a zero classification/prediction output by a machine learning model and/or (ii) a zero target classification/prediction for the machine learning model. In some embodiments, for example, the exception values may include zero prediction values associated with a machine learning regression model. By way of example, the exception values may include one or more zero prediction outputs and/or one or more zero target predictions associated with a machine learning regression model.

According to some examples, the process 600 includes replacing, at step/operation 606, at least one of the one or more exception values with a threshold value. For example, the one or more exception values may include one or more zero exception values indicative of at least (i) a zero classification/prediction output by a machine learning model and/or (ii) a zero target classification/prediction for the machine learning model. Responsive to an identification of one or more zero exception values, the predictive computing entity 104 may replace at least one of the more or more exception values with a threshold value. The threshold value may include any positive float value such as, for example, an epsilon value. In some embodiments, the predictive computing entity 104 may replace each zero exception value with the threshold value.

According to some examples, the process 600 may include identifying, at step/operation 608, a subset of valid evaluation functions from the plurality of evaluation functions. For example, the one or more exception values may include one or more negative exception values indicative of at least (i) a null/negative classification/prediction output by a machine learning model and/or (ii) a null/negative target classification/prediction for the machine learning model. Responsive to an identification of one or more negative exception values associated with the plurality of evaluation data objects, the predictive computing entity 104 may identify a subset of valid evaluation functions from the plurality of evaluation functions. By way of example, the subset of valid evaluation functions may include a subset of regression evaluation functions that may handle negative prediction outputs and/or target predictions.

According to some examples, the process 600 may include identifying, at step/operation 610, at least one evaluation function for evaluating the machine learning model from the subset of valid evaluation functions. For example, the predictive computing entity 104 can, responsive to an identification of one or more exception values associated with the plurality of evaluation data objects, identify a subset of valid regression evaluation functions from a plurality of regression evaluation functions that may handle the one or more identified exception values. The predictive computing entity 104 may identify the at least one evaluation function for evaluating the machine learning model from the subset of valid regression evaluation functions. In some embodiments, the predictive computing entity 104 may select each regression evaluation function from the subset of valid regression evaluation functions for evaluating the machine learning model.

In some embodiments, the predictive computing entity 104 may select each of the plurality of regression evaluation functions for evaluating the machine learning models and, in response to identifying the one or more exception values, the predictive computing entity 104 may (i) determine a subset of invalid regression evaluation functions that are not included in the subset of valid evaluation functions, and (ii) replace outputs from each of the subset of invalid regression evaluation functions with a null value.

Turning back to FIG. 4, according to some examples, at step/operation 404, the process 400 includes generating, using an evaluation function, a plurality of performance metrics for the machine learning model based at least in part on the evaluation dataset. For example, the predictive computing entity 104 may generate, using the evaluation function, at least two performance metrics for the machine learning model based at least in part on the plurality of evaluation data objects.

A performance metric may include a type of performance measure for evaluating the performance of a machine learning model. A performance metric may include an individual metric for a feature class of the evaluation feature and may depend on the machine learning model and/or the evaluation function utilized to evaluate the performance of the machine learning model. In some embodiments, for example, a performance metric for an individual feature class of an evaluation feature may include at least one of a: TPR, AUROC, FPR, FNR, TNR, FOR, FDR, NPV, PPV, Kappa score, balanced accuracy score, and/or the like for a machine learning classification model. As another example, the performance metric may include at least one of a: RMSE, MAPE, Adjusted R2, explainable variance regression loss, MSLE, mean poisson deviance measure, mean gamma deviance measure, gamma deviance measure, D2 poisson score, D2 gaussian score, D2 inverse gaussian score, pinball loss, and/or the like for a machine learning regression model.

The at least two performance metrics may include a first performance metric based at least in part on a first plurality of the plurality of evaluation data objects that are associated with a first feature class of the evaluation feature. For example, the first performance metric may be indicative of a performance (e.g., accuracy, and/or the like) of a machine learning model with respect to one or more classification, prediction, and/or the like tasks using the first plurality of the plurality of evaluation data objects. The first plurality of evaluation data objects may include each evaluation data object of the plurality of evaluation data objects within the evaluation dataset that is associated with a first feature class of the evaluation feature. By way of example, the first feature class may include a particular age range and the first plurality of the evaluation data objects may include each evaluation data object of the plurality of evaluation data objects that is associated with an age value within the particular age range.

In addition, or alternatively, the at least two performance metrics may include a second performance metric based at least in part on a second plurality of the plurality of evaluation data objects that are associated with a second feature class of the evaluation feature. For example, the second performance metric may be indicative of a performance (e.g., accuracy, and/or the like) of a machine learning model with respect to one or more classification, prediction, and/or the like tasks using the second plurality of the plurality of evaluation data objects. The second plurality of evaluation data objects may include each evaluation data object of the plurality of evaluation data objects within the evaluation dataset that is associated with a second feature class of the evaluation feature. By way of example, the second feature class may include another particular age range and the second plurality of the evaluation data objects may include each evaluation data object of the plurality of evaluation data objects that is associated with an age value within the other particular age range.

The predictive computing entity 104 may generate any number of performance metrics for a particular evaluation feature using a particular evaluation function. For example, the predictive computing entity 104 may generate a respective performance metric for each feature class of an evaluation feature. This may include, for example, a respective performance metric for each class bucket of a continuous evaluation feature. Each respective performance metric may be generated for each respective feature class by applying the evaluation function to a respective subset of evaluation data objects that are associated with a feature class value within a range of values defined by the respective feature class.

According to some examples, at step/operation 406, the process 400 includes generating a unitless dissimilarity metric for an evaluation feature based at least in part on the plurality of performance metrics and an average performance measure for the evaluation feature. For example, the predictive computing entity 104 may generate a unitless dissimilarity metric for the evaluation feature based at least in part on at least the first performance metric, the second performance metric, and/or the average performance measure of the at least two performance metrics.

The unitless dissimilarity metric, for example, may include a data entity that describes a universally comparable metric indicative of a level of bias associated with an evaluation feature for a machine learning model. The unitless dissimilarity metric may be based at least in part on a coefficient of variation (COV) and uses a complete distribution of values rather than value extremes to evaluate a level of bias over a group of performance metrics for a plurality of feature classes of an evaluation feature.

The unitless dissimilarity metric may include a unitless parameter (e.g., a percentage, ratio, and/or the like) that is indicative of a degree or magnitude of bias for a machine learning model with respect to a particular evaluation function and a particular evaluation feature. The unitless parameter is scaled such that a plurality of unitless dissimilarity metrics generated for a plurality of evaluation functions and/or evaluation features may be directly comparable. In this way, the unitless dissimilarity metric provides conclusive results that enable the direct comparison of a machine learning model's bias with respect to multiple different evaluation features as evaluated by multiple different performance metrics.

By way of example, the unitless dissimilarity metric may include a percentage value that is indicative of a magnitude or level of bias of a machine learning model with respect to an evaluation feature and/or an evaluation function. In some embodiments, for example, the unitless dissimilarity metric may be representative of a magnitude or level of bias of a machine learning model with respect to an evaluation function relative to each of a plurality of different evaluation functions. In addition, or alternatively, the unitless dissimilarity metric may be representative of a magnitude or level of bias of a machine learning model with respect to an evaluation feature relative to each of a plurality of different evaluation features. For example, the unitless dissimilarity metric may be directly comparable to each of a plurality of unitless dissimilarity metrics respectively generated for each of a plurality of different evaluation functions and/or evaluation features.

The unitless dissimilarity metric may be generated based at least in part on (i) a performance metric generated for a feature class of an evaluation feature, (ii) an average performance measure for the evaluation feature, and (iii) a standard feature deviation measure for the evaluation feature. The unitless dissimilarity metric, for example, may include the ratio (or a percentage derived thereof) of the average performance measure divided by the standard feature deviation measure for the evaluation feature.

FIG. 7 provides a flowchart diagram of an example process 700 for generating a unitless dissimilarity metric for a machine learning model in accordance with some embodiments discussed herein. FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially affect the function of the process 700. In other examples, different components of an example device or system that implements the process 700 may perform functions at substantially the same time or in a specific sequence. The process 700 may include a plurality of operations subsequent to step/operation 406 of FIG. 4, where the process 400 includes generating a unitless dissimilarity metric for an evaluation feature. In addition, or alternatively, the process 700 may include one or more sub-operations of step/operation 406 of FIG. 4.

According to some examples, the process 700 may include generating, at step/operation 702, an average performance measure for the evaluation feature. For example, the predictive computing entity 104 may generate the average performance measure of the at least two performance metrics based at least in part on the first performance metric and the second performance metric described herein. The average performance measure may be generated based at least in part on each performance metric generated for each feature class of a respective evaluation feature.

The average performance measure may describe a component of a unitless dissimilarity metric and may include a parameter of an evaluation feature that describes an average value of a respective performance metric generated for each feature class of an evaluation feature using a respective evaluation function. For instance, the average performance measure may be representative of an average of each of the plurality of performance metrics generated for the plurality of feature classes of the evaluation feature. By way of example, the average performance measure may be denoted as avg, the number of feature classes may be denoted as N, and a respective performance metric may be denoted as $x_i$, such that:

$$ave = \frac{1}{N}\sum_{i=0}^{N} x_i.$$

According to some examples, the process 700 may include generating, at step/operation 704, a plurality of feature deviation measures for the plurality of performance metrics generated for the evaluation feature. For example, the predictive computing entity 104 may generate at least two feature deviation measures corresponding to the at least two performance metrics described herein. A feature deviation measure may include a squared deviation between a particular performance metric and the average performance measure for an evaluation feature. The predictive computing entity 104 may generate a feature deviation measure for each performance metric respectively generated for each feature class of an evaluation feature. By way of example, the predictive computing entity 104 may generate a first feature deviation measure for a first feature class of the evaluation feature based at least in part on the first performance metric for the first feature class and the average performance measure for the evaluation feature. In addition, or alternatively, the predicted computing entity may generate a second feature deviation measure for the second feature class of the evaluation feature based at least in part on the second performance metric for the second feature class and the average performance measure for the evaluation feature. The first feature deviation measure may include a squared deviation between the first performance metric and the average performance measure. The second feature deviation measure may include a squared deviation between the second performance metric and the average performance measure.

In some embodiments, the predictive computing entity 104 may generate a unitless dissimilarity metric for the evaluation feature based at least in part on the first feature deviation measure and the second feature deviation measure described herein. For example, the predictive computing entity 104 may generate a plurality of feature deviation measures including a respective feature deviation measure for each feature class of an evaluation feature. The unitless dissimilarity metric may be based at least in part on the plurality of feature deviation measures.

According to some examples, the process 700 may include generating, at step/operation 706, a standard feature deviation measure for the evaluation feature based at least in part on the plurality of feature deviation measures. For example, the predictive computing entity 104 may generate the standard feature deviation measure for the evaluation feature based at least in part on the at least two feature deviation measures described herein. In some embodiments, the predictive computing entity 104 may generate the standard feature deviation measure for the evaluation feature based at least in part on each feature deviation measure respectively generated for each feature class (e.g., using a respective performance metric thereof) of the evaluation feature. By way of example, the predictive computing entity 104 may generate the standard feature deviation measure for the evaluation feature based at least in part on the first feature deviation measure and the second feature deviation measure described herein.

The standard feature deviation measure may include another component of a unitless dissimilarity metric that includes a parameter of an evaluation feature that describes an aggregate standard deviation for each respective performance metric generated for each respective feature class of an evaluation feature using a particular evaluation function. The standard feature deviation measure may include the square root of the sum of the squared deviation of each respective performance metric. For example, the standard feature deviation measure may include a square root of an aggregated feature deviation measure. The aggregated feature deviation measure may include a sum of at least the first feature deviation measure, the second feature deviation measure, and/or any other feature deviation measure respectively generated for additional feature classes of the evaluation feature.

As an example, an evaluation feature may include a first feature class with a corresponding first performance metric and a second feature class with a corresponding second performance metric. A first feature deviation measure (e.g., a squared deviation) may include a squared deviation between the first performance metric and an average performance measure for the evaluation feature. A second feature deviation measure (e.g., another squared deviation) may include a squared deviation between the second performance metric and the average performance measure for the evaluation feature. The standard feature deviation measure for the evaluation feature may include a square root of an aggregated feature deviation measure that includes the sum of at least the first feature deviation measure and the second feature deviation measure.

By way of example, the feature deviation measure, sqr $dev_i$, of a respective performance metric, $x_i$ may be:

$$sqr\ dev_i = (x_i - \text{avg})^2.$$

The standard feature deviation measure, std dev, of the evaluation feature may be:

$$std\ dev = \sqrt{\sum_{i=0}^{N} sqr\ dev_i}.$$

According to some examples, the process 700 includes generating, at step/operation 708, the unitless dissimilarity metric for the evaluation feature based at least in part on the standard feature deviation measure. For example, the predictive computing entity 104 may generate the unitless dissimilarity metric for the evaluation feature based at least in part on the standard feature deviation measure and the average performance measure. By way of example, the unitless dissimilarity metric for a respective evaluation feature may be found by:

$$(\text{avg}/std\ dev)*100.$$

FIG. 8 provides an operational example of a unitless dissimilarity metric 802 for a machine learning model in accordance with some embodiments discussed herein. As depicted, the unitless dissimilarity metric 802 may include a percentage value indicative of a magnitude of bias of a machine learning model with respect to the evaluation feature 804. The evaluation feature 804 may include a plurality of feature classes 806A-J. The predictive computing entity 104 may apply an evaluation function to a different subset of the plurality of evaluation data objects for each of the feature classes 806A-J to generate a respective performance metric 808 for each feature class 806A-J. The predictive computing entity 104 may process the performance metrics 808 to generate an average performance measure 810 for the evaluation feature 804. The predictive computing entity 104 may apply the average performance measure 810 to the respective performance metric 808 of each feature class 806A-J to generate a respective feature deviation measure 812 for each feature class 806A-J. The predictive computing entity 104 may generate a standard feature deviation measure 814 for the evaluation feature 804 based at least in part on each respective feature deviation measure 812 for each feature class 806A-J. The predictive computing entity 104 may generate the unitless dissimilarity metric 802 for the evaluation feature 804 based at least in part on the standard feature deviation measure 814 and the average performance measure 810.

Turning back to FIG. 4, according to some examples, at step/operation 408, the process 400 may include providing a machine learning verification output for the machine learning model based at least in part on the unitless dissimilarity metric for the evaluation feature. For example, the predictive computing entity 104 may provide the machine learning verification output for the machine learning model based at least in part on the unitless dissimilarity metric for the evaluation feature.

The machine learning verification output may describe a performance of the machine learning model and may include an indication (e.g., a colored marker, a text prompt, a shading/pattern, and/or the like) of whether the performance of the machine learning model achieves performance criteria for deploying the machine learning model for one or more different use cases. The indication may include a conclusive, easy to interpret, and extensive verification and/or nonverification of at least a portion of a machine learning model. In some embodiments, the machine learning model may be trained to optimize the machine learning verification output.

The machine learning verification output may be based at least in part on at least one unitless dissimilarity metric generated for the machine learning model. For example, the machine learning verification output may include an indication of a unitless dissimilarity metric generated for the machine learning model. In some embodiments, the machine learning verification output may include contextual indicators for a respective unitless dissimilarity metric that describe whether the unitless dissimilarity metric is acceptable for a particular use case. The contextual indicators, for example, may be based at least in part on a performance threshold associated with a particular evaluation feature and/or evaluation function.

The performance threshold, for example, may include one or more threshold percentages indicative of one or more levels of bias for a machine learning model. The performance threshold may be predetermined and/or dynamically determined based at least in part on a particular machine learning model and/or use case. In some embodiments, the performance threshold may include at least three thresholds. A first threshold may be indicative of a preferred percentage range (e.g., ≤10%), a second threshold may be indicative of an acceptable percentage range (e.g., ≤30%), and a third threshold may be indicative of an unacceptable percentage range (e.g., >30%). The performance thresholds may be universally applicable to each of a plurality of different unitless dissimilarity metrics generated for each of a plurality of different evaluation features using a plurality of different evaluation functions. In addition, or alternatively, the performance threshold may be dynamically defined based at least in part on the evaluation feature and/or evaluation function.

The contextual indicators may indicate whether a respective unitless dissimilarity metric for a respective evaluation feature/evaluation function is (i) preferred based at least in part on the first threshold range (e.g., the unitless dissimilarity metric is equal to or below 10%), (ii) acceptable based at least in part on the second threshold range (e.g., the unitless dissimilarity metric is equal to or below 30%), and/or unacceptable based at least in part on the third threshold range (e.g., the unitless dissimilarity metric exceeds 30%). The contextual indicators may be provided for display in relation to a plurality of different unitless dissimilarity metrics to respectively indicate an acceptability of each of the plurality of different unitless dissimilarity metrics. By way of example, a contextual indicator for a respective unitless dissimilarity metric may include a shading, coloring, or other marking to a data structure (e.g., a text box, a table entry, a tree node, and/or the like) associated with the respective unitless dissimilarity.

In some embodiments, the machine learning verification output for a machine learning model may include an evaluation report interface. The evaluation report interface may dynamically provide for display bias evaluation information for a machine learning model in an interactive format. The evaluation report interface may include a plurality of interactive widgets respectively associated with each of a plurality of different unitless dissimilarity metrics respectively generated for a machine learning model.

FIG. 9 provides an operational example of a machine learning verification output 900 for a machine learning model in accordance with some embodiments discussed herein. The machine learning verification output 900 may include an example evaluation report interface. The example evaluation report interface may include a plurality of different indications respectively describing a plurality of different unitless dissimilarity metrics 902 generated for the machine learning model. The plurality of different unitless dissimilarity metrics 902 may respectively correspond to each of a plurality of different evaluation features 904A-B and/or evaluation functions 906A-L. Each of the plurality of different unitless dissimilarity metrics 902 may be representative of a magnitude or level of bias of the machine learning model with respect to an evaluation feature/evaluation function relative to each of the plurality of different evaluation features 904A-B/evaluation functions 906A-L. Each of the plurality of different unitless dissimilarity metrics 902 for each of the plurality of different evaluation features 904A-B/evaluation functions 906A-L may be directly comparable.

For example, the machine learning verification output 900 for the machine learning model may include a plurality of different unitless dissimilarity metrics 902 for each of a plurality of different evaluation functions 906A-L. By way of example, the machine learning verification output 900 may include a first example indication of a first unitless dissimilarity metric 908A for the first evaluation feature 904A, a second indication of a second unitless dissimilarity metric 908B for the first evaluation feature 904A, and/or the like. The first unitless dissimilarity metric 908A may be based at least in part on a first evaluation function 906A, the second unitless dissimilarity metric 908B may be based at least in part on a second evaluation function 906B, and/or the like. In this manner, the machine learning verification output 900 for the machine learning model may include multiple unitless dissimilarity metrics for an evaluation feature 904A that each correspond to a plurality of different evaluation functions that may evaluate different aspects of the evaluation feature 904A. For example, the predictive computing entity 104 may generate, for the first evaluation feature 904A, using a first evaluation function 906A, the first unitless dissimilarity metric 908A that corresponds to the first evaluation function 906A. In addition, or alternatively, the predictive computing entity 104 may generate, for the first evaluation feature 904A, using a second evaluation function 906B, the second unitless dissimilarity metric 908B that corresponds to the second evaluation function 906B. This process may be repeated for each evaluation function 906A-L identified for a particular use case and provided for display via the machine learning verification output 900.

The plurality of different evaluation functions 906A-L for the machine learning model may include a plurality of machine learning classification evaluation functions, a plurality of machine learning regression evaluation functions, and/or the like depending on the machine learning model being evaluated. A unitless dissimilarity metric for a particular evaluation feature/evaluation function may be representative of a level of bias of the machine learning model with respect to the evaluation function relative to each of the plurality of different evaluation functions 906A-L. By way of example, the first evaluation function 906A may be a RMSE function and the second evaluation function 906B may be a MAPE function. The second unitless dissimilarity metric 908B may be indicative of a degree of bias of a machine learning model with respect to a MAPE relative to a degree of bias of a machine learning model with respect an RMSE (e.g., as illustrated by the first unitless dissimilarity metric 908A).

In addition, or alternatively, the machine learning verification output 900 for the machine learning model may include a plurality of different unitless dissimilarity metrics 902 for each of a plurality of different evaluation features 904A-B. For example, the machine learning verification output may include a first indication of a first unitless dissimilarity metric 908A for the first evaluation feature 904A, a third indication of the third unitless dissimilarity metric 908C for a second evaluation feature 904B, and/or the like. The first unitless dissimilarity metric 908A, for example, may correspond to the first evaluation feature 904A. The predictive computing entity 104 may generate the first unitless dissimilarity metric 908A for the first evaluation feature 904A using a first evaluation function 906A. In addition, or alternatively, the third unitless dissimilarity metric 908C, for example, may correspond to the second evaluation feature 904B. The predictive computing entity 104 may generate the third unitless dissimilarity metric 908C for the second evaluation feature 904B using the first evaluation function 906A. This process may be repeated for each evaluation feature 904A-B identified for a particular use case and provided for display via the machine learning verification output 900.

The third unitless dissimilarity metric 908C may be indicative of a degree of bias relative to the first unitless dissimilarity metric 908A. For example, a unitless dissimilarity metric for a particular evaluation feature may be representative of a level of bias of the machine learning model with respect to an evaluation feature relative to each of the plurality of different evaluation features 904A-B. By way of example, the first evaluation feature 904A may include an age feature and the first unitless dissimilarity metric 908A may be indicative of a level of bias of the machine learning model with respect to the age of an evaluation data object. The second evaluation feature 904B may include a hospital feature and the third unitless dissimilarity metric 908C may be indicative of a level of bias of the machine learning model with respect to a hospital of an evaluation data object. The first unitless dissimilarity metric 908A may be indicative of a degree or level of bias exhibited by the machine learning model relative to the third unitless dissimilarity metric 908C such that a user may directly compare the bias of the machine learning model with respect to an age and hospital associated with an evaluation data object (e.g., in this case the machine learning model would be more biased towards age than hospitals). Other evaluation features may include different protected features such as gender, race, and/or the like to enable the direct comparison between a machine learning model's bias with respect to each of a plurality of different protected features.

In some embodiments, the machine learning verification output 900 may include one or more contextual identifiers associated with at least one of the plurality of different unitless dissimilarity metrics 902. For example, as described herein, the contextual identifiers may include an indication (e.g., a shading, coloring, or other marking, and/or the like) that describes the performance of the machine learning model and/or whether the performance of the machine learning model achieves performance criteria for deploying the machine learning model for one or more different use cases. For example, a contextual indicator for a respective unitless dissimilarity metric may include a shading, coloring, or other marking to a data structure (e.g., a text box, a table entry, a tree node, and/or the like) associated with the respective unitless dissimilarity. The contextual identifiers may include a conclusive insight for a machine learning model with respect to a particular evaluation feature and/or evaluation function. By way of example, as described herein, the contextual indicators may be based at least in part on a performance threshold associated with a particular evaluation feature and/or evaluation function. The performance threshold, for example, may include a first threshold 910, a second threshold 912, and/or a third threshold 914 indicative of a performance of the machine learning model with respect to the first threshold 910, second threshold 912, and/or third threshold 914.

In some embodiments, the machine learning verification output 900 may include one or more interactive widgets. The one or more interactive widgets may correspond to one or more respective unitless dissimilarity metrics, one or more respective evaluation features, and/or one or more evaluation functions. By way of example, in some embodiments, the one or more interactive widgets may respectively correspond to each of one or more unitless dissimilarity metrics. The one or more interactive widgets may accept user input and, responsive to the user input, initiate the presentation of additional information (e.g., a class level verification output) for a respective unitless dissimilarity metric.

FIG. 10 provides a flowchart diagram of an example process 1000 for generating a class level verification output for a machine learning model in accordance with some embodiments discussed herein. The flowchart diagram depicts a class level evaluation scheme for generating class level insights for a machine learning model based at least in part on evaluation dataset for the machine learning model. The class level evaluation scheme may be implemented by one or more computing devices and/or systems described herein. For example, the predictive computing entity 104 may utilize the class level evaluation scheme to overcome the various limitations with conventional evaluation mechanisms for machine learning models that lack the comprehensibility, conclusivity, and transparency provided by the evaluation metrics described by the present disclosure.

FIG. 10 illustrates an example process 1000 for explanatory purposes. Although the example process 1000 depicts a particular sequence of steps/operations, the sequence may be altered without departing from the scope of the present disclosure. For example, some of the steps/operations depicted may be performed in parallel or in a different sequence that does not materially affect the function of the process 1000. In other examples, different components of an example device or system that implements the process 1000 may perform functions at substantially the same time or in a specific sequence. In some embodiments, the process 1000 may include a plurality of steps/operations subsequent to step/operation 406 of FIG. 4, where the process 400 includes generating a unitless dissimilarity metric for an evaluation feature.

According to some examples, the process 1000 may include generating, at step/operation 1002, a feature class deviation measure for a feature class of the evaluation feature based at least in part on a performance metric and the average performance measure for the evaluation feature. The feature class deviation measure may refer to a data entity that describes a component of a feature class level parameter for evaluating a machine learning model's bias with respect to individual feature classes of an evaluation feature. The feature class deviation measure for a respective feature class may include an absolute deviation of a performance metric for the feature class from an average performance measure for the evaluation feature. By way of example, feature class deviation measure, abs $dev_i$, for a respective performance metric, $x_i$, a may be found by:

$$abs\ dev_i = \text{absolute}(x_i - \text{avg}).$$

In some embodiments, the predictive computing entity 104 may generate a respective feature class deviation measure for each feature class of an evaluation feature. In addition, or alternatively, the predictive computing entity 104 may generate a respective feature class deviation measure for each of a subset of feature classes of the evaluation feature. By way of example, the predictive computing entity 104 may generate a first feature class deviation measure for a first feature class based at least in part on a first performance metric and the average performance measure. The first feature class deviation measure may include an absolute deviation of the first performance metric from the average performance measure for the evaluation feature. This may be repeated for one or more different feature classes of the evaluation feature.

According to some examples, the process 1000 may include generating, at step/operation 1004, a class contribution metric for the feature class based at least in part on the feature class deviation measure and the average performance measure. A class contribution metric may include a percentage value indicative of a relative bias of the machine learning model with respect to a particular feature class of an evaluation feature relative to the other feature classes of the evaluation feature. The class contribution metric may describe a feature class level parameter for evaluating a machine learning model's bias with respect to individual feature classes of an evaluation feature. The class contribution metric may be representative of a contribution of a respective feature class deviation measure to a unitless dissimilarity metric generated for an evaluation feature. The class contribution metric, for example, may describe a level and/or magnitude of bias of a machine learning model with respect to an individual feature class of the evaluation feature. A class contribution metric for a respective feature class may include a percentage mean deviation of a performance metric for a feature class from an average performance measure for the evaluation feature. By way of example, a class contribution metric, fc $dev_i$, for a respective performance metric, $x_{i,\ may}$ be found by:

$$fc\ dev_i=(abs(x_i-\text{avg})/\text{avg})*100 \text{ or}$$

$$fc\ dev_i=(abs\ dev/\text{avg})*100.$$

In some embodiments, the predictive computing entity 104 may generate a respective class contribution metric for each feature class of an evaluation feature. In addition, or alternatively, the predictive computing entity 104 may generate a respective class contribution metric for each of a subset of feature classes of the evaluation feature. By way of example, the predictive computing entity 104 may generate a class contribution metric for a first feature class based at least in part on the first feature class deviation measure and the average performance measure. The class contribution metric for the first feature class may include a percentage value indicative of a relative bias of the machine learning model with respect to the first feature class of the evaluation feature relative to one or more different feature classes of the evaluation feature. This may be repeated for one or more different feature classes of the evaluation feature to highlight different class level biases exhibited by a machine learning model.

According to some examples, the process 1000 includes providing, at step/operation 1006, a class level verification output for the machine learning model that includes an indication of the class contribution metric for a feature class of the evaluation feature. For example, the predictive computing entity 104 may provide a class level verification output for the machine learning model that includes the indication of the class contribution metric for the first feature class, a second feature class, and/or any other feature class of the evaluation feature.

The class level verification output may describe a performance of a machine learning model with respect to an individual feature class of an evaluation feature. By way of example, the class level verification output may include an indication of a class contribution metric for a respective feature class of an evaluation feature. In some embodiments, the class level verification output may include a respective class contribution metric for each feature class of an evaluation feature.

FIG. 11 provides an operational example of a class level verification output 1100 for a machine learning model in accordance with some embodiments discussed herein. The class level verification output 1100 may provide a plurality of class level insights for an evaluation feature 804. The insights, for example, may include at least one of a feature class deviation measure 1102 and/or a class contribution metric 1104 for at least one of a plurality of feature classes 806A-J of the evaluation feature 804. By way of example, the class level verification output 1100 may include a feature class deviation measure 1102 and/or a class contribution metric 1104 for each feature class 806A-J of the evaluation feature 804.

In some embodiments, the class level verification output 1100 may provide one or more identifiers for emphasizing one or more features of interest. By way of example, the one or more identifiers may mark an outlier class contribution metric 1106 to identify a potentially biased feature class 1108. The potentially biased feature class 1108, for example, may include a respective feature class 806J of the evaluation feature 804 that is associated with one or more performance deviations (e.g., improved and/or degraded results) relative to other feature classes 806A-I of the evaluation feature 804.

In some embodiments, the class level verification output 1100 may be selectively generated and/or provided in response to a stimulus.

As one example, the class level verification output 1100 may be provided based at least in part on a comparison between a unitless dissimilarity metric for an evaluation feature 804 and/or the one or more performance thresholds. By way of example, in response to determining that the unitless dissimilarity metric for the evaluation feature 804 exceeds a performance threshold, the predictive computing entity 104 may provide the class level verification output 1100 for the machine learning model to provide insights on where a machine learning model is exhibiting bias with respect to the evaluation feature 804.

As another example, the class level verification output 1100 may be provided based at least in part on user input. By way of example, as described herein, a machine learning verification output may include one or more interactive widgets. The one or more interactive widgets, for example, may include interactive unitless dissimilarity metric indicators displayed by an evaluation report interface. The predictive computing entity 104 may receive, using the one or more interactive widgets, user input associated with the machine learning verification output and, in response to the user input, the predictive computing entity 104 may provide the class level verification output 1100 for the machine learning model. The user input, for example, may be indicative of a unitless dissimilarity metric for a particular evaluation feature and the class level verification output 1100 may include a plurality of class level insights for the particular evaluation feature.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

inputting, by one or more processors, a plurality of test input data objects to a machine learning model to receive a plurality of prediction outputs;

receiving, by the one or more processors, an evaluation dataset for the machine learning model, wherein the evaluation dataset comprises a plurality of evaluation data objects associated with (i) a plurality of different feature classes of an evaluation feature and (ii) a plurality of target predictions respectively corresponding to the plurality of prediction outputs;

identifying, by the one or more processors, at least one evaluation function for evaluating the machine learning model based at least in part on the evaluation dataset and the evaluation feature by:

(i) receiving data indicative of a plurality of regression evaluation functions for evaluating the machine learning model, (ii) responsive to an identification of one or more exception values associated with the plurality of evaluation data objects, identifying a subset of valid regression evaluation functions from the plurality of regression evaluation functions, and (iii) identifying the at least one evaluation function for evaluating the machine learning model from the subset of valid regression evaluation functions;

generating, by the one or more processors and using the at least one evaluation function, at least two performance metrics for the machine learning model based at least in part on the plurality of evaluation data objects, wherein the at least two performance metrics comprise a first performance metric associated with a first feature class of the plurality of different feature classes and a second performance metric associated with a second feature class of the plurality of different feature classes;

generating, by the one or more processors, a unitless dissimilarity metric for the evaluation feature based at least in part on the first performance metric and the second performance metric; and providing, by the one or more processors, a machine learning verification output for the machine learning model based at least in part on the unitless dissimilarity metric, wherein the machine learning verification output is used to detect bias in the machine learning model.

2. The computer-implemented method of claim 1, wherein:

the machine learning model comprises a machine learning regression model, the plurality of evaluation data objects is associated with a plurality of target predictions, and the at least one evaluation function comprises a regression evaluation function configured to evaluate a performance of the machine learning regression model based at least in part on a comparison between (i) a plurality of prediction outputs generated, using the machine learning regression model, for the plurality of evaluation data objects, and (ii) the plurality of target predictions associated with the plurality of evaluation data objects.

3. The computer-implemented method of claim 1, wherein the one or more exception values comprise at least one of (i) a negative prediction output or (ii) a negative target prediction associated with the plurality of evaluation data objects.

4. The computer-implemented method of claim 1, further comprising:

responsive to an identification of one or more exception values associated with the plurality of evaluation data objects, replacing, by the one or more processors, at least one of the one or more exception values with a threshold value.

5. The computer-implemented method of claim 4, wherein the one or more exception values comprise at least one of (i) a zero prediction output or (ii) a zero target prediction associated with the plurality of evaluation data objects, and the threshold value is a positive float value.

6. The computer-implemented method of claim 1, wherein the at least one evaluation function for evaluating the machine learning model comprises a first evaluation function and the unitless dissimilarity metric comprises a first unitless dissimilarity metric that corresponds to the first evaluation function, and the computer-implemented method further comprises:

generating, for the evaluation feature, by the one or more processors, and using a second evaluation function, a second unitless dissimilarity metric that corresponds to the second evaluation function, wherein the second unitless dissimilarity metric is indicative of a degree of bias relative to the first unitless dissimilarity metric.

7. The computer-implemented method of claim 6, wherein the first evaluation function is a root mean squared error (RMSE) function, and the second evaluation function is a mean absolute percentage error (MAPE) function.

8. The computer-implemented method of claim 6, wherein the machine learning verification output for the machine learning model comprises a first indication of the first unitless dissimilarity metric for the evaluation feature and a second indication of the second unitless dissimilarity metric for the evaluation feature.

9. The computer-implemented method of claim 1, wherein the evaluation feature comprises a first evaluation feature and the unitless dissimilarity metric comprises a first unitless dissimilarity metric that corresponds to the first evaluation feature, and the computer-implemented method further comprises:

generating, by the one or more processors and using the at least one evaluation function, a second unitless dissimilarity metric for a second evaluation feature, wherein the second unitless dissimilarity metric is indicative of a degree of bias relative to the first unitless dissimilarity metric.

10. The computer-implemented method of claim 9, wherein the machine learning verification output for the machine learning model comprises a first indication of the first unitless dissimilarity metric for the first evaluation feature and a second indication of the second unitless dissimilarity metric for the second evaluation feature.

11. A system comprising:

one or more processors; and at least one memory storing processor-executable instructions that, when executed by the one or more processors, cause the one or more processors to:

input a plurality of test input data objects to a machine learning model to receive a plurality of prediction outputs;

receive an evaluation dataset for the machine learning model, wherein the evaluation dataset comprises a plurality of evaluation data objects associated with (i)

a plurality of different feature classes of an evaluation feature and (ii) a plurality of target predictions respectively corresponding to the plurality of prediction outputs;

identify at least one evaluation function for evaluating the machine learning model based at least in part on the evaluation dataset and the evaluation feature by:

(i) receiving data indicative of a plurality of regression evaluation functions for evaluating the machine learning model, (ii) responsive to an identification of one or more exception values associated with the plurality of evaluation data objects, identifying a subset of valid regression evaluation functions from the plurality of regression evaluation functions, and (iii) identifying the at least one evaluation function for evaluating the machine learning model from the subset of valid regression evaluation functions;

generate, using the at least one evaluation function, at least two performance metrics for the machine learning model based at least in part on the plurality of evaluation data objects, wherein the at least two performance metrics comprise a first performance metric associated with a first feature class of the plurality of different feature classes and a second performance metric associated with a second feature class of the plurality of different feature classes;

generate a unitless dissimilarity metric for the evaluation feature based at least in part on the first performance metric and the second performance metric; and provide a machine learning verification output for the machine learning model based at least in part on the unitless dissimilarity metric, wherein the machine learning verification output is used to detect bias in the machine learning model.

12. The system of claim 11, wherein:

the machine learning model comprises a machine learning regression model, the plurality of evaluation data objects is associated with a plurality of target predictions, and the at least one evaluation function comprises a regression evaluation function configured to evaluate a performance of the machine learning regression model based at least in part on a comparison between (i) a plurality of prediction outputs generated, using the machine learning regression model, for the plurality of evaluation data objects, and (ii) the plurality of target predictions associated with the plurality of evaluation data objects.

13. The system of claim 11, wherein the one or more exception values comprise at least one of (i) a negative prediction output or (ii) a negative target prediction associated with the plurality of evaluation data objects.

14. The system of claim 11, wherein the one or more processors are further caused to:

responsive to an identification of one or more exception values associated with the plurality of evaluation data objects, replace at least one of the one or more exception values with a threshold value.

15. The system of claim 11, wherein the at least one evaluation function for evaluating the machine learning model comprises a first evaluation function and the unitless dissimilarity metric comprises a first unitless dissimilarity metric that corresponds to the first evaluation function, and the one or more processors are further caused to:

generate, for the evaluation feature and using a second evaluation function, a second unitless dissimilarity metric that corresponds to the second evaluation function, wherein the second unitless dissimilarity metric is indicative of a degree of bias relative to the first unitless dissimilarity metric.

16. The system of claim 15, wherein the evaluation feature comprises a first evaluation feature and the first unitless dissimilarity metric corresponds to the first evaluation feature, and the one or more processors are further caused to:

generate, using the at least one evaluation function, a third unitless dissimilarity metric for a second evaluation feature, wherein the third unitless dissimilarity metric is indicative of a degree of bias relative to the first unitless dissimilarity metric.

17. The system of claim 16, wherein the machine learning verification output for the machine learning model comprises a first indication of the first unitless dissimilarity metric, a second indication of the second unitless dissimilarity metric, and a third indication of the third unitless dissimilarity metric.

18. One or more non-transitory computer-readable storage media including instructions that, when executed by one or more processors, cause the one or more processors to:

input a plurality of test input data objects to a machine learning model to receive a plurality of prediction outputs;

receive an evaluation dataset for the machine learning model, wherein the evaluation dataset comprises a plurality of evaluation data objects associated with (i) a plurality of different feature classes of an evaluation feature and (ii) a plurality of target predictions respectively corresponding to the plurality of prediction outputs;

identify at least one evaluation function for evaluating the machine learning model based at least in part on the evaluation dataset and the evaluation feature by:

(i) receiving data indicative of a plurality of regression evaluation functions for evaluating the machine learning model, (ii) responsive to an identification of one or more exception values associated with the plurality of evaluation data objects, identifying a subset of valid regression evaluation functions from the plurality of regression evaluation functions, and (iii) identifying the at least one evaluation function for evaluating the machine learning model from the subset of valid regression evaluation functions;

generate, using the at least one evaluation function, at least two performance metrics for the machine learning model based at least in part on the plurality of evaluation data objects, wherein the at least two performance metrics comprise a first performance metric associated with a first feature class of the plurality of different feature classes and a second performance metric associated with a second feature class of the plurality of different feature classes;

generate a unitless dissimilarity metric for the evaluation feature based at least in part on the first performance metric and the second performance metric; and provide a machine learning verification output for the machine learning model based at least in part on the unitless dissimilarity metric, wherein the machine learning verification output is used to detect bias in the machine learning model.

* * * * *